(12) United States Patent
Chuang et al.

(10) Patent No.: US 11,381,176 B2
(45) Date of Patent: Jul. 5, 2022

(54) SWITCHING POWER CONVERSION CIRCUIT AND SWITCHING CIRCUIT

(71) Applicant: Richtek Technology Corporation, Zhubei (TW)

(72) Inventors: Yung-Chun Chuang, Taipei (TW); Huan-Chien Yang, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/227,276

(22) Filed: Apr. 10, 2021

(65) Prior Publication Data

US 2021/0351719 A1    Nov. 11, 2021

(30) Foreign Application Priority Data

May 5, 2020    (TW) .................................. 109114856

(51) Int. Cl.
*H02M 7/5387* (2007.01)
*H02M 1/00* (2006.01)

(52) U.S. Cl.
CPC ....... *H02M 7/5387* (2013.01); *H02M 1/0006* (2021.05)

(58) Field of Classification Search
CPC ........... H02M 7/5387; H02M 7/53871; H02M 7/53873; H02M 1/0006; H02M 1/0003
See application file for complete search history.

(56) References Cited

U.S. PATENT DOCUMENTS

| | | | |
|---|---|---|---|
| 10,181,744 B2* | 1/2019 | Huang | H02J 7/342 |
| 2019/0028031 A1* | 1/2019 | Scoones | H02M 3/1588 |

* cited by examiner

*Primary Examiner* — Adolf D Berhane
(74) *Attorney, Agent, or Firm* — Tung & Associates

(57) ABSTRACT

A switching power conversion circuit includes a conversion capacitor, a capacitive power conversion circuit, an inductor, an inductive power conversion circuit and a switching control circuit. The capacitive power conversion circuit switches the conversion capacitor periodically according to a switching control signal generated by the switching control circuit, to generate a first intermediate voltage and a first proportional voltage in a promptly rising mode and to generate a second intermediate voltage and a second proportional voltage in a promptly falling mode. In the promptly rising mode, a rising slope of an inductor current is determined by a difference between a high level of the first proportional voltage and an output voltage. In the promptly falling mode, a falling slope of the inductor current is determined by a difference between a low level of the second proportional voltage and the output voltage.

16 Claims, 7 Drawing Sheets

Nc11 has V1 or V2 ;
Or, Nc11 has V1, while Nc12 has V2

SWITCHING POWER CONVERSION CIRCUIT AND SWITCHING CIRCUIT

CROSS REFERENCE

The present invention claims priority to TW 109114856 filed on May 5, 2020.

BACKGROUND OF THE INVENTION

Field of Invention

The present invention relates to a switching power conversion circuit; particularly, it relates to such switching power conversion circuit having fast inductor current rising and falling speeds. The present invention also relates to a switching circuit for use in the above-mentioned switching power conversion circuit.

Description of Related Art

Please refer to FIG. 1A, which shows a schematic diagram of a conventional switching power conversion circuit (i.e., switching power conversion circuit 1). The switching power conversion circuit 1 comprises: a switching control circuit 10 and a buck switching power conversion circuit 11. The switching control circuit 10 is configured to operably generate a switching control signal dl. The buck switching power conversion circuit 11 includes: a switch S1, a switch S2, an inductor L' and an output capacitor Co'. The switch S1 and the switch S2 operate the inductor L' according to a duty ratio of the switching control signal dl, so as to convert an input voltage Vin' to an output voltage Vout'. A switching voltage VLX' in a form of a pulse wave exists between the switch S1 and the switch S2. By switching the switch S1 and the switch S2, the switching voltage VLX' will have a high level (i.e., the level of the input voltage Vin') and a low level (i.e., ground level). Please refer to FIG. 1B, which illustrates a waveform diagram depicting the operation of the switching power conversion circuit of FIG. 1A. An inductor current iL' flowing through the inductor L' has a rising slope and a falling slope. The rising slope of the inductor current iL' is determined by a difference between the high level (i.e., the level of the input voltage Vin') of the switching voltage VLX' and the output voltage Vout', whereas, the falling slope of the inductor current iL' is determined by a difference between the low level (i.e., ground level) of the switching voltage VLX' and the output voltage Vout'.

It is noteworthy that, in the prior art of FIG. 1A, even though the switching control signal dl has a high duty ratio, the rising slope of the inductor current iL' is still limited by the difference between the input voltage Vin' and the output voltage Vout', and the falling slope of the inductor current iL' is still limited by the difference between the ground level and the output voltage Vout'. As a result, the inductor current iL' is unable to rise or fall promptly.

As compared to the prior art in FIG. 1A, the present invention is advantageous in that: under a case where the duty ratio of the switching control signal remains same, the present invention is capable of increasing an absolute value of the rising slope and/or the falling slope of the inductor current. That is, the present invention is capable of causing the inductor current to rise or fall promptly, thereby significantly improving the operation efficiency and performance.

SUMMARY OF THE INVENTION

From one perspective, the present invention provides a switching power conversion circuit, comprising: a first conversion capacitor; a capacitive power conversion circuit including a plurality of power switches, wherein the plurality of power switches of the capacitive power conversion circuit include at least one shared power switch; an inductor coupled between a proportional voltage node and an output voltage, wherein an inductor current flows through the inductor; an inductive power conversion circuit including a plurality of power switches, wherein the plurality of power switches of the inductive power conversion circuit include the at least one shared power switch; and a switching control circuit, which is configured to operably generate a switching control signal; wherein the switching power conversion circuit is configured to operate in a promptly rising mode and a promptly falling mode; wherein in the promptly rising mode, the plurality of power switches of the capacitive power conversion circuit are configured to periodically switch a coupling relationship of the first conversion capacitor among the proportional voltage node, an input voltage and ground voltage level according to a duty ratio of the switching control signal, so as to generate a first intermediate voltage at a first end of the first conversion capacitor, wherein the first intermediate voltage is in a form of a pulse wave; and wherein in the promptly rising mode, the plurality of power switches of the inductive power conversion circuit are configured to periodically switch a coupling relationship of the inductor among the first intermediate voltage, the output voltage and the ground voltage level according to the duty ratio of the switching control signal, so as to generate the output voltage; wherein a high level of the first intermediate voltage is a first proportion of the input voltage, wherein the first proportion is a real number which is greater than one, wherein the proportional voltage node has a first proportional voltage; wherein in the promptly falling mode, the plurality of power switches of the capacitive power conversion circuit are configured to periodically switch the coupling relationship of the first conversion capacitor among the proportional voltage node, the input voltage and the ground voltage level according to the duty ratio of the switching control signal, so as to generate a second intermediate voltage at the first end or a second end of the first conversion capacitor, wherein the second intermediate voltage is in a form of a pulse wave; and wherein in the promptly falling mode, the plurality of power switches of the inductive power conversion circuit are configured to periodically switch a coupling relationship of the inductor among the second intermediate voltage, the output voltage and the ground voltage level according to the duty ratio of the switching control signal, so as to generate the output voltage; wherein a low level of the second intermediate voltage is a second proportion of the input voltage, wherein the second proportion is a real number which is smaller than or equal to minus one (−1), wherein the proportional voltage node has a second proportional voltage; wherein in the promptly rising mode, a rising slope of the inductor current is determined according to a difference between a high level of the first proportional voltage and the output voltage; wherein in the promptly falling mode, a falling slope of the inductor current is determined according to a difference between a low level of the second proportional voltage and the output voltage.

In one embodiment, the switching power conversion circuit is further configured to operate in a general mode; wherein in the general mode, a part of the plurality of power switches of the capacitive power conversion circuit are conductive, whereas another part of the plurality of power switches of the capacitive power conversion circuit are nonconductive, such that the first end of the first conversion capacitor has a constant voltage; wherein the plurality of power switches of the inductive power conversion circuit periodically switch the coupling relationship of the inductor among the constant voltage, the output voltage and the ground voltage level according to the duty ratio of the switching control signal, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage; wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

In one embodiment, the at least one shared power switch includes a first power switch and a second power switch, wherein the first power switch is coupled between the first end of the first conversion capacitor and the proportional voltage node, whereas, the second power switch is coupled between the second end of the first conversion capacitor and the proportional voltage node; wherein the capacitive power conversion circuit is configured as a charge pump circuit, wherein the plurality of power switches of the capacitive power conversion circuit further include: a third power switch coupled between the input voltage and the first end of the first conversion capacitor; a fourth power switch coupled between the input voltage and the second end of the first conversion capacitor; a fifth power switch coupled between the second end of the first conversion capacitor and the ground voltage level; and a sixth power switch coupled between the first end of the first conversion capacitor and the ground voltage level; wherein the inductive power conversion circuit is configured as a buck switching power conversion circuit, wherein the plurality of power switches of the inductive power conversion circuit further include a seventh power switch coupled between the proportional voltage node and the ground voltage level; wherein in the promptly rising mode, the first power switch, the third power switch, the fourth power switch, the fifth power switch and the seventh power switch operate according to the duty ratio, wherein during a duty period, the first power switch and the fourth power switch are controlled to be conductive, whereas, the third power switch, the fifth power switch and the seventh power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the third power switch, the fifth power switch and the seventh power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level, and a connection path between the proportional voltage node and the ground voltage level are conductive, whereby the first intermediate voltage has a low level and the first proportional voltage has ground level; wherein in the promptly falling mode, the second power switch, the third power switch, the fifth power switch, the sixth power switch and the seventh power switch operate according to the duty ratio, wherein during a non-duty period, the second power switch and the sixth power switch are controlled to be conductive, whereas, the third power switch, the fifth power switch and the seventh power switch are controlled to be nonconductive, such that a connection path between the first end of the first conversion capacitor and the ground voltage level and a connection path between the second end of the first conversion capacitor and the proportional voltage node are conductive, wherein the second end of the first conversion capacitor has the second intermediate voltage and the second intermediate voltage has the low level and the second proportional voltage has the low level; wherein during a duty period, the third power switch, the fifth power switch and the seventh power switch are controlled to be conductive, whereas, the second power switch and the sixth power switch are controlled to be nonconductive, such that a connection path between the input voltage and the first end of the first conversion capacitor, a connection path between the second end of the first conversion capacitor and the ground voltage level, and a connection path between the proportional voltage node and the ground voltage level are conductive, whereby the second intermediate voltage has a high level and the second proportional voltage has the ground level.

In one embodiment, the switching power conversion circuit is further configured to operate in a general mode, wherein in the general mode, the third power switch and the fifth power switch of the capacitive power conversion circuit are controlled to be conductive, whereas, the second power switch, the fourth power switch and the sixth power switch are controlled to be nonconductive, such that the first end of the first conversion capacitor has a constant voltage; wherein the first power switch and the seventh power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage; wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

In one embodiment, the at least one shared power switch includes a first power switch, wherein the first power switch is coupled between the first end of the first conversion capacitor and the proportional voltage node, wherein the capacitive power conversion circuit is configured as a charge pump circuit, wherein the plurality of power switches of the capacitive power conversion circuit further include: a second power switch coupled between the input voltage and the first end of the first conversion capacitor; a third power switch coupled between the input voltage and the second end of the first conversion capacitor; a fourth power switch coupled between the second end of the first conversion capacitor and the ground voltage level; a fifth power switch coupled between the input voltage and the second end of the first conversion capacitor; a sixth power switch coupled between the second end of the first conversion capacitor and the ground voltage level; and a seventh power switch coupled between the first end of the first conversion capacitor and the ground voltage level; wherein the inductive power conversion circuit is configured as a buck switching power conversion circuit, wherein the plurality of power switches of the inductive power conversion circuit further include an eighth power switch coupled between the proportional voltage node and the ground voltage level; wherein in the promptly rising mode, the first power switch, the second power switch, the third power switch, the fourth power switch and the eighth power switch operate according to the duty ratio, wherein during a duty period, the first power switch and the third power switch are controlled to be conductive, whereas, the second power switch, the fourth power switch and the eighth power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the second power switch, the fourth power switch and the eighth power switch are controlled to be conductive, whereas, the first power switch and the third power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level; wherein in the promptly falling mode, the first power switch, the fifth power switch, the sixth power switch, the seventh power switch and the eighth power switch operate according to the duty ratio, wherein during a non-duty period, the first power switch and the sixth power switch are controlled to be conductive, whereas, the fifth power switch, the seventh power switch and the eighth power switch are controlled to be nonconductive, such that a connection path between the second end of the first conversion capacitor and the ground voltage level and a connection path between the first end of the first conversion capacitor and the proportional voltage node are conductive, wherein the first end of the first conversion capacitor has the second intermediate voltage, such that the second intermediate voltage has the low level and the second proportional voltage has the low level; wherein during a duty period, the fifth power switch, the seventh power switch and the eighth power switch are controlled to be conductive, whereas, the first power switch and the sixth power switch are controlled to be nonconductive, such that a connection path between the input voltage and the second end of the first conversion capacitor, a connection path between the first end of the first conversion capacitor and the ground voltage level and a connection path between the proportional voltage node and the ground voltage level are conductive, whereby the second intermediate voltage has a high level and the second proportional voltage has the ground level.

In one embodiment, the switching power conversion circuit is further configured to operate in a general mode, wherein in the general mode, the second power switch and the fourth power switch of the capacitive power conversion circuit are controlled to be conductive, whereas, the third power switch, the fifth power switch, the sixth power switch and the seventh power switch are controlled to be nonconductive, such that the first end of the first conversion capacitor has a constant voltage; wherein the first power switch and the eighth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to the ground level; wherein the level of the constant voltage is substantially equal to the input voltage; wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

From another perspective, the present invention provides a switching power conversion circuit, comprising: a first conversion capacitor; a second conversion capacitor; a capacitive power conversion circuit including a plurality of power switches, wherein the plurality of power switches of the capacitive power conversion circuit include at least one shared power switch; an inductor coupled between a proportional voltage node and an output voltage, wherein an inductor current flows through the inductor; an inductive power conversion circuit including a plurality of power switches, wherein the plurality of power switches of the inductive power conversion circuit include the at least one shared power switch; and a switching control circuit, which is configured to operably generate a switching control signal; wherein the at least one shared power switch includes a first power switch and a second power switch, wherein the first power switch is coupled between the first end of the first conversion capacitor and the proportional voltage node, whereas, the second power switch is coupled between the first end of the second conversion capacitor and the proportional voltage node; wherein the capacitive power conversion circuit is configured as a charge pump circuit, wherein the plurality of power switches of the capacitive power conversion circuit further include: a third power switch coupled between an input voltage and the first end of the first conversion capacitor; a fourth power switch coupled between the input voltage and the second end of the first conversion capacitor; a fifth power switch coupled between the second end of the first conversion capacitor and ground voltage level; a sixth power switch coupled between the first end of the second conversion capacitor and the ground voltage level; a seventh power switch coupled between the second end of the second conversion capacitor and the ground voltage level; and an eighth power switch coupled between the second end of the second conversion capacitor and the input voltage; wherein the inductive power conversion circuit is configured as a buck switching power conversion circuit, wherein the plurality of power switches of the inductive power conversion circuit further include a ninth power switch coupled between the proportional voltage node and the ground voltage level; wherein the switching power conversion circuit is configured to operate in a promptly rising mode and a promptly falling mode; wherein in the promptly rising mode, the first power switch, the third power switch, the fourth power switch, the fifth power switch and the ninth power switch operate according to the duty ratio of the switching control signal, wherein during a duty period, the first power switch and the fourth power switch are controlled to be conductive, whereas, the third power switch, the fifth power switch and the ninth power switch are controlled to be nonconductive, such that a connection path between the input voltage and the second end of the first conversion capacitor and a connection path between the first end of the first conversion capacitor and the proportional voltage node are conductive, whereby the first intermediate voltage at the first end of the first conversion capacitor has a high level and the first proportional voltage at the proportional voltage node has a high level; wherein during a non-duty period, the third power switch, the fifth power switch and the ninth power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level; wherein in the promptly falling mode, the second power switch, the sixth power switch, the seventh power switch, the eighth power switch and the ninth power switch operate according to the duty ratio, wherein during a non-duty period, the second power switch and the seventh power switch are controlled to be conductive, whereas, the sixth power switch, the eighth power switch and the ninth power switch are controlled to be nonconductive, such that a connection path between the second end of the second conversion capacitor and the ground voltage level and a connection path between the first end of the second conversion capacitor and the proportional voltage node are conductive, whereby the second intermediate voltage at the first end of the second conversion capacitor has a low level and the second proportional voltage at the proportional voltage node has a low level; wherein during a duty period, the sixth power switch, the eighth power switch and the ninth power switch are controlled to be conductive, whereas, the second power switch and the seventh power switch are controlled to be nonconductive, such that a connection path between the input voltage and the second end of the second conversion capacitor, a connection path between the first end of the second conversion capacitor and the ground voltage level and a connection path between the proportional voltage node and the ground voltage level are conductive, whereby the second intermediate voltage has a high level and the second proportional voltage has the ground level.

In one embodiment, the switching power conversion circuit is further configured to operate in a general mode, wherein in the general mode, the third power switch and the fifth power switch of the capacitive power conversion circuit are controlled to be conductive, whereas, the second power switch, the fourth power switch, the sixth power switch, the seventh power switch and the eighth power switch are controlled to be nonconductive, such that the first end of the first conversion capacitor has a constant voltage; wherein the first power switch and the ninth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage; wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

From yet another perspective, the present invention provides a switching circuit, comprising: a capacitive power conversion circuit including a plurality of power switches, wherein the plurality of power switches of the capacitive power conversion circuit include at least one shared power switch; an inductive power conversion circuit including a plurality of power switches, wherein the plurality of power switches of the inductive power conversion circuit include the at least one shared power switch; and a switching control circuit, which is configured to operably generate a switching control signal; wherein the switching power conversion circuit is configured to operate in a promptly rising mode and a promptly falling mode; wherein in the promptly rising mode, the plurality of power switches of the capacitive power conversion circuit are configured to periodically switch a coupling relationship of the first conversion capacitor among the proportional voltage node, an input voltage and ground voltage level according to a duty ratio of the switching control signal, so as to generate a first intermediate voltage at a first end of the first conversion capacitor, wherein the first intermediate voltage is in a form of a pulse wave; and wherein in the promptly rising mode, the plurality of power switches of the inductive power conversion circuit are configured to periodically switch a coupling relationship of the inductor among the first intermediate voltage, the output voltage and the ground voltage level according to the duty ratio of the switching control signal, so as to generate the output voltage; wherein a high level of the first intermediate voltage is a first proportion of the input voltage, wherein the first proportion is a real number which is greater than one, wherein the proportional voltage node has a first proportional voltage; wherein in the promptly falling mode, the plurality of power switches of the capacitive power conversion circuit are configured to periodically switch the coupling relationship of the first conversion capacitor among the proportional voltage node, the input voltage and the ground voltage level according to the duty ratio of the switching control signal, so as to generate a second intermediate voltage at the first end or a second end of the first conversion capacitor, wherein the second intermediate voltage is in a form of a pulse wave; and wherein in the promptly falling mode, the plurality of power switches of the inductive power conversion circuit are configured to periodically switch a coupling relationship of the inductor among the second intermediate voltage, the output voltage and the ground voltage level according to the duty ratio of the switching control signal, so as to generate the output voltage; wherein a low level of the second intermediate voltage is a second proportion of the input voltage, wherein the second proportion is a real number which is smaller than or equal to minus one (−1), wherein the proportional voltage node has a second proportional voltage; wherein in the promptly rising mode, a rising slope of the inductor current is determined according to a difference between a high level of the first proportional voltage and the output voltage; wherein in the promptly falling mode, a falling slope of the inductor current is determined according to a difference between a low level of the second proportional voltage and the output voltage.

From still another perspective, the present invention provides a switching circuit, comprising: a capacitive power conversion circuit including a plurality of power switches, wherein the plurality of power switches of the capacitive power conversion circuit include at least one shared power switch; an inductor coupled between a proportional voltage node and an output voltage, wherein an inductor current flows through the inductor; an inductive power conversion circuit including a plurality of power switches, wherein the plurality of power switches of the inductive power conversion circuit include the at least one shared power switch; and a switching control circuit, which is configured to operably generate a switching control signal; wherein the at least one shared power switch includes a first power switch and a second power switch, wherein the first power switch is coupled between the first end of the first conversion capacitor and the proportional voltage node, whereas, the second power switch is coupled between the first end of the second conversion capacitor and the proportional voltage node; wherein the capacitive power conversion circuit is configured as a charge pump circuit, wherein the plurality of power switches of the capacitive power conversion circuit further include: a third power switch coupled between an input voltage and the first end of the first conversion capacitor; a fourth power switch coupled between the input voltage and the second end of the first conversion capacitor; a fifth power switch coupled between the second end of the first conversion capacitor and ground voltage level; a sixth power switch coupled between the first end of the second conversion capacitor and the ground voltage level; a seventh power switch coupled between the second end of the second conversion capacitor and the ground voltage level; and an eighth power switch coupled between the second end of the second conversion capacitor and the input voltage; wherein the inductive power conversion circuit is configured as a buck switching power conversion circuit, wherein the plurality of power switches of the inductive power conversion circuit further include a ninth power switch coupled between the proportional voltage node and the ground voltage level; wherein the switching power conversion circuit is configured to operate in a promptly rising mode and a promptly falling mode; wherein in the promptly rising mode, the first power switch, the third power switch, the fourth power switch, the fifth power switch and the ninth power switch operate according to the duty ratio of the switching control signal, wherein during a duty period, the first power switch and the fourth power switch are controlled to be conductive, whereas, the third power switch, the fifth power switch and the ninth power switch are controlled to be nonconductive, such that a connection path between the input voltage and the second end of the first conversion capacitor and a connection path between the first end of the first conversion capacitor and the proportional voltage node are conductive, whereby the first intermediate voltage at the first end of the first conversion capacitor has a high level and the first proportional voltage at the proportional voltage node has a high level; wherein during a non-duty period, the third power switch, the fifth power switch and the ninth power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level; wherein in the promptly falling mode, the second power switch, the sixth power switch, the seventh power switch, the eighth power switch and the ninth power switch operate according to the duty ratio, wherein during a non-duty period, the second power switch and the seventh power switch are controlled to be conductive, whereas, the sixth power switch, the eighth power switch and the ninth power switch are controlled to be nonconductive, such that a connection path between the second end of the second conversion capacitor and the ground voltage level and a connection path between the first end of the second conversion capacitor and the proportional voltage node are conductive, whereby the second intermediate voltage at the first end of the second conversion capacitor has a low level and the second proportional voltage at the proportional voltage node has a low level; wherein during a duty period, the sixth power switch, the eighth power switch and the ninth power switch are controlled to be conductive, whereas, the second power switch and the seventh power switch are controlled to be nonconductive, such that a connection path between the input voltage and the second end of the second conversion capacitor, a connection path between the first end of the second conversion capacitor and the ground voltage level and a connection path between the proportional voltage node and the ground voltage level are conductive, whereby the second intermediate voltage has a high level and the second proportional voltage has the ground level.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
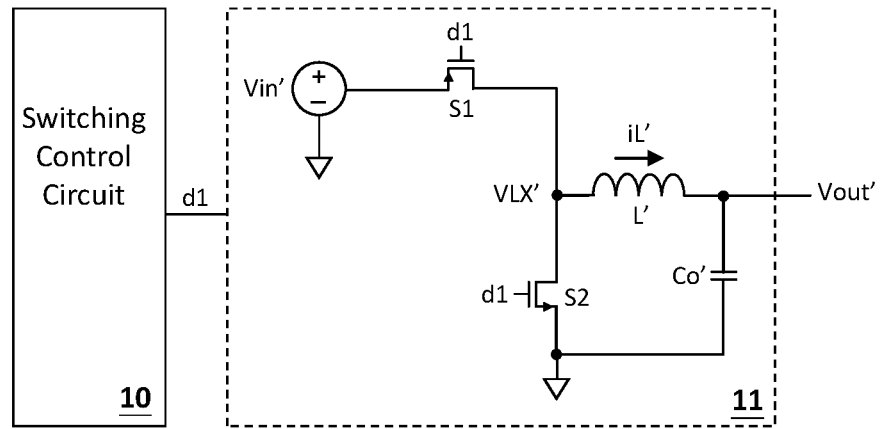
FIG. 1A shows a schematic diagram of a conventional switching power conversion circuit.
Figure 1B:
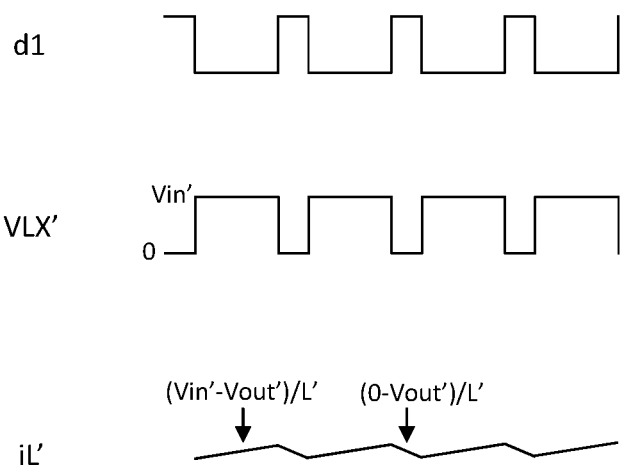
FIG. 1B illustrates a waveform diagram depicting the operation of a switching power conversion circuit of FIG. 1A.
Figure 2A:
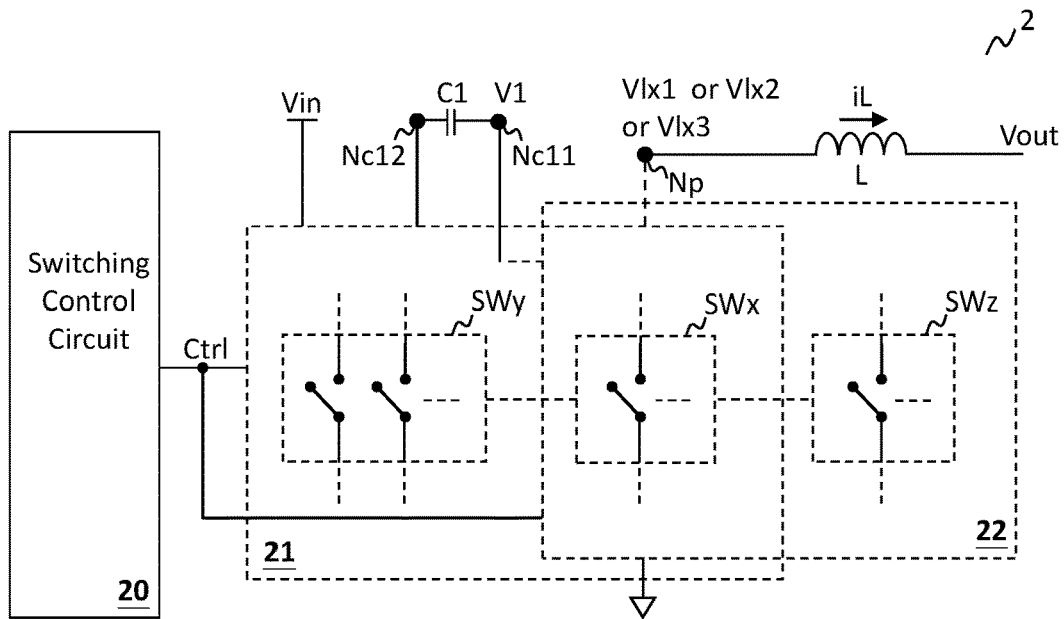
FIG. 2A shows a schematic block diagram of a switching power conversion circuit according to an embodiment of the present invention.

Please refer to FIG. 2A, which shows a schematic block diagram of a switching power conversion circuit (i.e., switching power conversion circuit 2) according to an embodiment of the present invention. The switching power conversion circuit 2 comprises: a first conversion capacitor C1, a capacitive power conversion circuit 21, an inductor L, an inductive power conversion circuit 22 and a switching control circuit 20.

In one embodiment, the capacitive power conversion circuit 21 includes plural power switches (i.e., power switches SWx and SWy, wherein x and y both denote a number of the power switch, wherein x is a positive integer which is greater than or equal to one and y is a positive integer which is greater than or equal to two). The power switches of the capacitive power conversion circuit 21 include at least one shared power switch (i.e., the power switch SWx). The inductor L is coupled between a proportional voltage node Np and an output voltage Vout. An inductor current iL flows through the inductor L. The power switches of the inductive power conversion circuit 22 include the at least one shared power switch (i.e., the power switch SWx). That is, in this embodiment, the power switch SWx is shared by the capacitive power conversion circuit 21 and the inductive power conversion circuit 22. The switching control circuit 20 is configured to operably generate a switching control signal Ctrl.

Figure 2B:
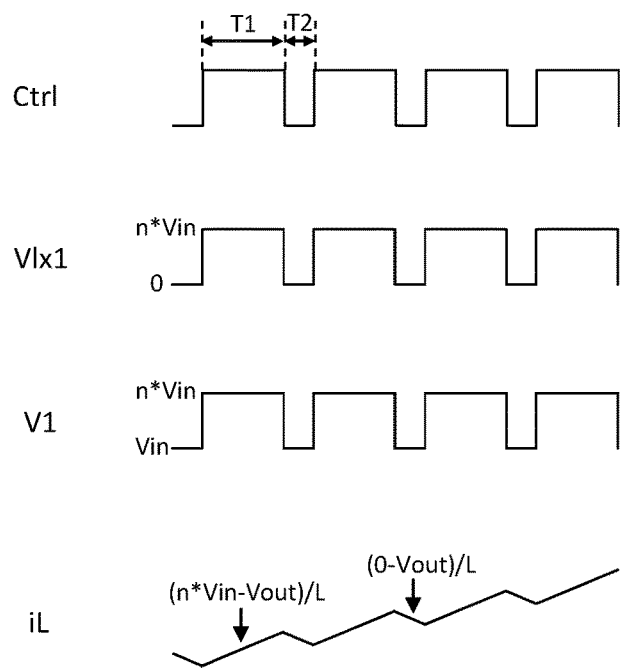
FIG. 2B illustrates a waveform diagram depicting a case where the switching power conversion circuit of FIG. 2A operates in a promptly rising mode.

In one embodiment, the switching power conversion circuit 2 can operate in a promptly rising mode, a promptly falling mode or a general mode. Please refer to FIG. 2A in conjugation with FIG. 2B. FIG. 2B illustrates a waveform diagram depicting a case where the switching power conversion circuit of FIG. 2A operates in a promptly rising mode. In the promptly rising mode, the power switches SWx and SWy of the capacitive power conversion circuit 21 are configured to periodically switch the coupling relationship of the first conversion capacitor C1 among the proportional voltage node Np, an input voltage Vin and ground voltage level (i.e., to couple the first conversion capacitor C1 between two of the proportional voltage node Np, an input voltage Vin and ground voltage level) according to a duty ratio (e.g., T1/(T1+T2)) of the switching control signal Ctrl, so as to generate a first intermediate voltage V1 at a first end Nc11 of the first conversion capacitor C1. And, in the promptly rising mode, the power switches SWx and SWy of the inductive power conversion circuit 22 are configured to periodically switch the coupling relationship of the inductor L among the first intermediate voltage V1, the output voltage Vout and the ground voltage level (i.e., to couple the inductor L of the inductive power conversion circuit 22 between two of the inductor L among the first intermediate voltage V1, the output voltage Vout and the ground voltage level and periodically switch the coupling) according to the duty ratio of the switching control signal Ctrl, so as to generate the output voltage Vout. As shown in FIG. 2B, in one embodiment, the first intermediate voltage V1 is in a form of a pulse wave, wherein the high level of the first intermediate voltage V1 is a first proportion n of the input voltage Vin (i.e. n*Vin). The first proportion n is a real number which is greater than one. The proportional voltage node Np has a first proportional voltage Vlx1.

For example, in the embodiment where the switching power conversion circuit 2 operates in a promptly rising mode, the power switches SWx and SWy of the capacitive power conversion circuit 21 are configured as a positive charge pump circuit, wherein by the switching operations of the power switch SWx and the power switch SWy, the high level of the first intermediate voltage V1 is substantially a first proportion (as shown by n in FIG. 2B) of the input voltage Vin. In this embodiment, the high level of the first proportional voltage Vlx1 corresponds to the high level of the first intermediate voltage V1, whereas, the low level of the first proportional voltage Vlx1 corresponds to ground level. In the embodiment where the switching power conversion circuit 2 operates in a promptly rising mode, a rising slope of the inductor current iL is determined according to a difference between the high level (i.e., n*Vin) of the first proportional voltage Vlx1 and the output voltage Vout, while, a falling slope of the inductor current iL is determined according to a difference between the low level (i.e., the ground level) of the first proportional voltage Vlx1 and the output voltage Vout. Because the first proportion n is a real number which is greater than one, the rising slope of the inductor current iL in the present invention is greater than the rising slope of the inductor current iL in the prior art; the rising slope of the inductor current iL in the present invention is not limited by the input voltage Vin, so the inductor current iL can be promptly elevated up.

Figure 2C:
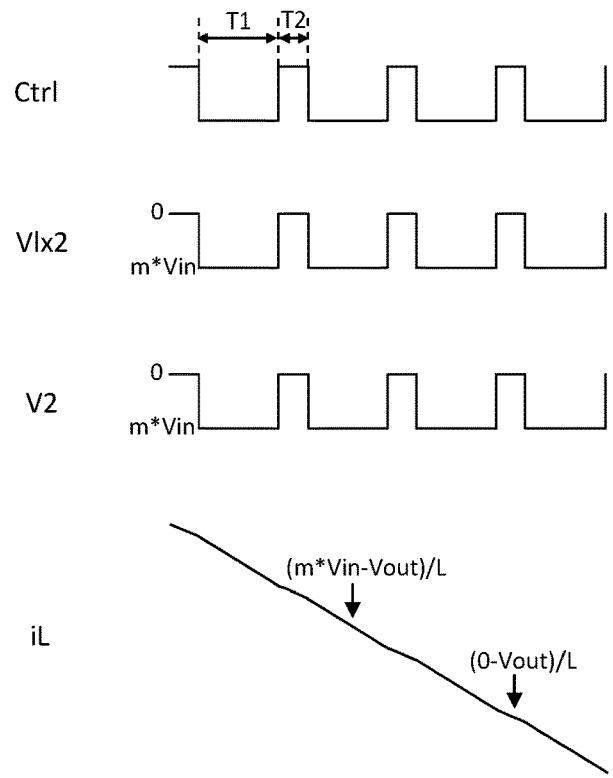
FIG. 2C illustrates a waveform diagram depicting a case where the switching power conversion circuit of FIG. 2A operates in a promptly falling mode.

Please refer to FIG. 2A in conjugation with FIG. 2C. FIG. 2C illustrates a waveform diagram depicting a case where the switching power conversion circuit of FIG. 2A operates in a promptly falling mode. In the promptly falling mode, the power switches SWx and SWy of the capacitive power conversion circuit 21 are configured to periodically switch the coupling relationship of the first conversion capacitor C1 among the proportional voltage node Np, the input voltage Vin and the ground voltage level according to the duty ratio (e.g., T2/(T1+T2)) of the switching control signal Ctrl, so as to generate a second intermediate voltage V2 at the first end Nc11 or a second end Nc12 of the first conversion capacitor C1. In the promptly falling mode, the power switches SWx and SWy of the inductive power conversion circuit 22 are configured to periodically switch the coupling relationship of the inductor L among the second intermediate voltage V2, the output voltage Vout and the ground voltage level according to the duty ratio of the switching control signal Ctrl, so as to generate the output voltage Vout. As shown in FIG. 2C, the second intermediate voltage V2 is in a form of a pulse wave. The low level of the second intermediate voltage V2 is a second proportion m of the input voltage Vin (i.e. m*Vin). The second proportion m is a real number which is smaller than or equal to minus one (−1). The proportional voltage node Np has a second proportional voltage Vlx2.

For example, in the embodiment where the switching power conversion circuit 2 operates in a promptly falling mode, the power switches SWx and SWy of the capacitive power conversion circuit 21 are configured as a negative charge pump circuit. Under such situation, by switching the power switch SWx and the power switch SWy, the low level of the second intermediate voltage V2 is substantially a second proportion (as shown by m in FIG. 2C) of the input voltage Vin. In this embodiment, the low level of the second proportional voltage Vlx2 corresponds to the low level of the second intermediate voltage V2, whereas, the high level of the second proportional voltage Vlx2 corresponds to ground level. In the embodiment where the switching power conversion circuit 2 operates in a promptly falling mode, a part of the falling slope of the inductor current iL is determined according to a difference between the low level (i.e., m*Vin) of the second proportional voltage Vlx2 and the output voltage Vout, and another part of the falling slope of the inductor current iL is determined according to a difference between the high level (i.e., ground level) of the second proportional voltage Vlx2 and the output voltage Vout. Because the second proportion m is a real number which is smaller than or equal to minus one (−1), an absolute value of the falling slope of the inductor current iL in the present invention is greater than an absolute value of a falling slope of the inductor current iL in the prior art; the falling slope of the inductor current iL in the present invention is not limited by the ground level, so the inductor current iL can be promptly reduced.

Figure 2D:
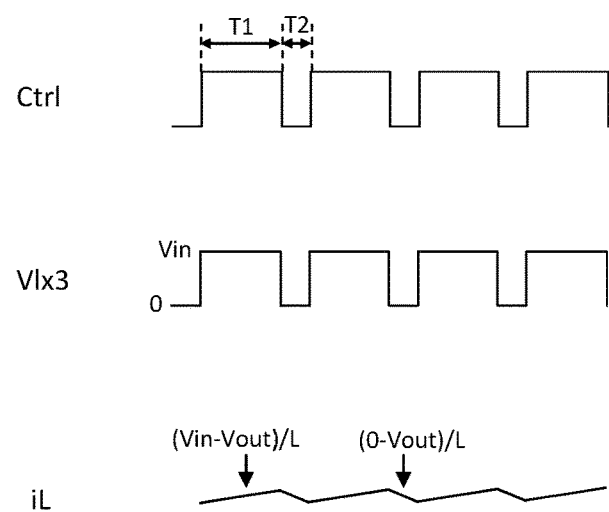
FIG. 2D illustrates a waveform diagram depicting a case where the switching power conversion circuit of FIG. 2A operates in a general mode.

Please refer to FIG. 2A in conjugation with FIG. 2D. FIG. 2D illustrates a waveform diagram depicting a case where the switching power conversion circuit of FIG. 2A operates in a general mode. In the general mode, a part of the power switches SWx and SWy of the capacitive power conversion circuit 21 are conductive, whereas another part of power switches SWx and SWy of the capacitive power conversion circuit 21 are nonconductive, such that the first end Nc11 of the first conversion capacitor C1 has a constant voltage. The power switches SWx and SWy of the inductive power conversion circuit 22 are configured to periodically switch the coupling relationship of the inductor L among the constant voltage, the output voltage Vout and the ground voltage level according to the duty ratio (e.g., T1/(T1+T2)) of the switching control signal Ctrl, whereby a third proportional voltage Vlx3 at the proportional voltage node Np is in a form of a pulse wave. The third proportional voltage Vlx3 has a high level which corresponds to a level of the constant voltage, and a low level which corresponds to ground level. In one embodiment, the level of the constant voltage is substantially equal to the input voltage Vin. In this embodiment, in the general mode, the rising slope of the inductor current iL is determined according to a difference between the high level (i.e., Vin) of the third proportional voltage Vlx3 and the output voltage Vout, and the falling slope of the inductor current iL is determined according to a difference between the low level (i.e., the ground level) of the third proportional voltage Vlx3 and the output voltage Vout. In this embodiment when the switching power conversion circuit 2 operates in the general mode, the inductor current iL is not promptly elevated up or reduced.

Figure 3A:
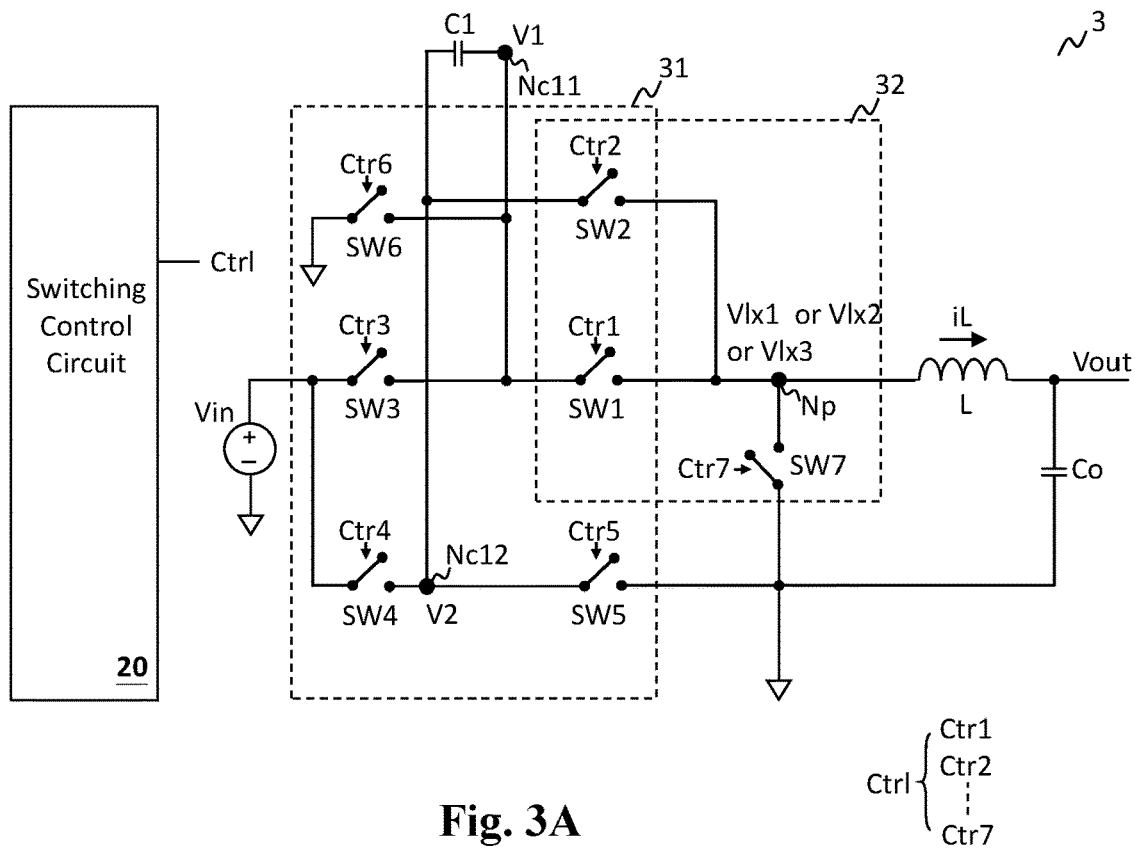
FIG. 3A shows a schematic block diagram of a switching power conversion circuit according to a specific embodiment of the present invention.

Please refer to FIG. 3A, which shows a schematic block diagram of a switching power conversion circuit (i.e., switching power conversion circuit 3) according to a specific embodiment of the present invention. The switching power conversion circuit 3 comprises: a switching control circuit 20, a first conversion capacitor C1, a capacitive power conversion circuit 31, an inductor L and an inductive power conversion circuit 32. In one embodiment, an output capacitor Co is coupled between an output voltage Vout and ground voltage level.

In one embodiment, the power switch SWx includes a first power switch SW1 and a second power switch SW2. The first power switch SW1 is coupled between the first end Nc11 of the first conversion capacitor C1 and the proportional voltage node Np, whereas, the second power switch SW2 is coupled between the second end Nc12 of the first conversion capacitor C1 and the proportional voltage node Np. The first power switch SW1 and the second power switch SW2 are the power switches shared by the capacitive power conversion circuit 31 and the inductive power conversion circuit 32. In this embodiment, the capacitive power conversion circuit 31 is configured as a charge pump circuit. The power switches SWy of the capacitive power conversion circuit 31 include: a third power switch SW3, a fourth power switch SW4, a fifth power switch SW5 and a sixth power switch SW6.

In one embodiment, the third power switch SW3 is coupled between the input voltage Vin and the first end Nc11 of the first conversion capacitor C1. The fourth power switch coupled between the input voltage Vin and the second end Nc12 of the first conversion capacitor C1. The fifth power switch is coupled between the second end Nc12 of the first conversion capacitor C1 and the ground voltage level. The sixth power switch is coupled between the first end Nc11 of the first conversion capacitor C1 and the ground voltage level.

Please still refer to FIG. 3A. In this embodiment, the inductive power conversion circuit 32 is configured as a buck switching power conversion circuit. The power switch SWz of the inductive power conversion circuit 32 further includes a seventh power switch SW7, which is coupled between the proportional voltage node Np and the ground voltage level. In this embodiment, the switching control signal Ctrl generated by the switching control circuit 20 includes first to seventh switching control signals Ctrl1~Ctrl7 for controlling the corresponding first to seventh power switches SW1~SW7, respectively.

Figure 3B:
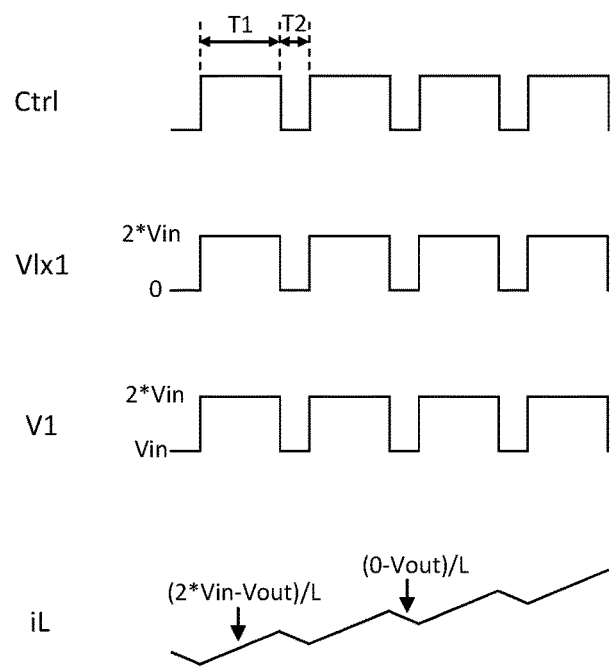
FIG. 3B illustrates a waveform diagram depicting a case where a switching power conversion circuit of the present invention operates in a promptly rising mode.

In one embodiment, the switching power conversion circuit 3 can operate in a promptly rising mode, a promptly falling mode or a general mode. Please refer to FIG. 3A in conjugation with FIG. 3B. FIG. 3B illustrates a waveform diagram depicting a case where the switching power conversion circuit of the present invention operates in a promptly rising mode. In the promptly rising mode, the first power switch SW1, the third power switch SW3, the fourth power switch SW4, the fifth power switch SW5 and the seventh power switch SW7 are respectively controlled by the first, third, fourth, fifth and seventh switching control signals (Ctr1, Ctr3~Ctr5 and Ctr7), so that the first power switch SW1, the third power switch SW3, the fourth power switch SW4, the fifth power switch SW5 and the seventh power switch SW7 operate according to the duty ratio (e.g., T1/(T1+T2)) of the switching control signals Ctrl, to generate the first intermediate voltage V1 at the first end Nc11 of the first conversion capacitor C1 and to generate the first proportional voltage Vlx1 at the proportional voltage node Np.

More specifically, during a non-duty period (in this embodiment, a non-duty period is a period wherein the first power switch SW1 is controlled to be nonconductive according to the duty ratio, such as the period T2 in FIG. 3B), the third power switch SW3, the fifth power switch SW5 and the seventh power switch SW7 are controlled to be conductive, whereas, the first power switch SW1 and the fourth power switch SW4 are controlled to be nonconductive. Under such situation, in the capacitive power conversion circuit 31, the first conversion capacitor C1 is correspondingly coupled between the input voltage Vin and the ground voltage level, such that a connection path between the input voltage Vin and the first end Nc11 of the first conversion capacitor C1, and a connection path between the second end Nc12 of the first conversion capacitor C1 and the ground voltage level are conductive. That is, the first conversion capacitor C1 is charged to a voltage level which is equal to the input voltage Vin via the third power switch SW3 and the fifth power switch SW5, whereby the first intermediate voltage V1 has a low level (i.e., the input voltage Vin). On the other hand, in the inductive power conversion circuit 32, a connection path between the proportional voltage node Np and the ground voltage level are conductive, so that the inductor L is coupled between the ground voltage level and the output voltage Vout, whereby the first proportional voltage Vlx1 has ground level.

During a duty period (in this embodiment, a duty period is a period wherein the first power switch SW1 is controlled to be conductive according to the duty ratio, such as the period T1 in FIG. 3B), the first power switch SW1 and the fourth power switch SW4 are controlled to be conductive, whereas, the third power switch SW3, the fifth power switch SW5 and the seventh power switch SW7 are controlled to be nonconductive. Under such situation, in the capacitive power conversion circuit 31, the first conversion capacitor C1 is correspondingly coupled between the input voltage Vin and the proportional voltage node Np, such that a connection path between the input voltage Vin and the second end Nc12 of the first conversion capacitor C1 and a connection path between the first end Nc11 of the first conversion capacitor C1 and the proportional voltage node Np are conductive. Under such situation, the first intermediate voltage V1 is pumped up to the high level by adding the input voltage Vin with a voltage (which is also equal to the input voltage Vin in this embodiment) stored in the first conversion capacitor C1. In this embodiment, as shown in FIG. 3B, during a duty period (e.g., period T1), the first intermediate voltage V1 is pumped up to the high level (i.e., 2*Vin). On the other hand, in the inductive power conversion circuit 32, the first power switch SW1 is controlled to be conductive, and the seventh power switch SW7 is controlled to be nonconductive, such that the inductor L is coupled between the first intermediate voltage V1 and the output voltage Vout, whereby the first proportional voltage V1 has the high level (i.e., 2*Vin).

In the embodiment where the switching power conversion circuit 2 operates in a promptly rising mode, a rising slope of the inductor current iL is determined according to a difference between the high level (i.e., 2*Vin) of the first proportional voltage Vlx1 and the output voltage Vout, while, a falling slope of the inductor current iL is determined according to a difference between a low level (i.e., the ground level) of the first proportional voltage Vlx1 and the output voltage Vout. Because the high level (i.e., 2*Vin) of the first proportional voltage Vlx1 is greater than the level in the prior art, the rising slope of the inductor current iL in the present invention is greater than the rising slope of the inductor current iL in the prior art, and the rising slope of the inductor current iL in the present invention is not limited by the input voltage Vin, so the inductor current iL can be promptly elevated up.

Figure 3C:
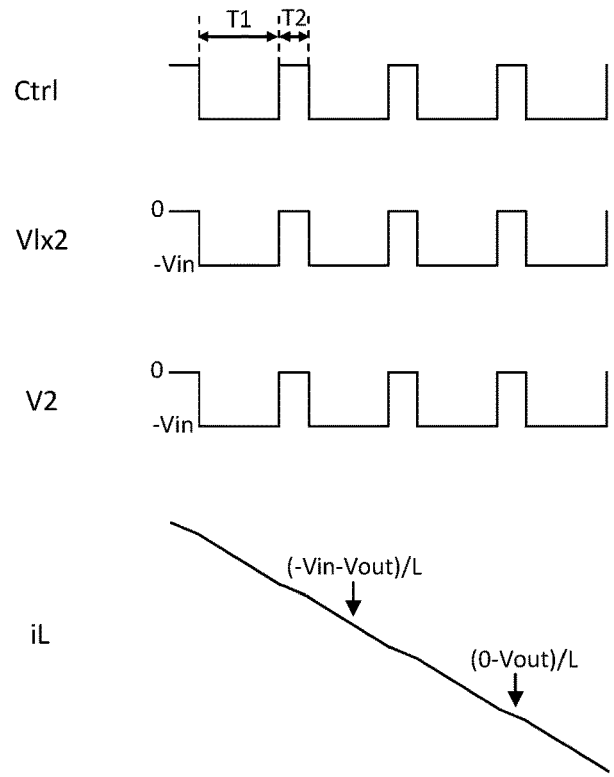
FIG. 3C illustrates a waveform diagram depicting a case where a switching power conversion circuit of the present invention operates in a promptly falling mode.

Please refer to FIG. 3A in conjugation with FIG. 3C. FIG. 3C illustrates a waveform diagram depicting a case where the switching power conversion circuit of the present invention operates in a promptly falling mode. In the promptly falling mode, in one embodiment, the first power switch SW1 and the fourth power switch SW4 are controlled to be nonconductive. The second power switch SW2, the third power switch SW3, the fifth power switch SW5, the sixth power switch SW6 and the seventh power switch SW7 are respectively controlled by the second, third, fifth, sixth and seventh switching control signals (Ctr2, Ctr3 and Ctr5~Ctr7), so that the second power switch SW2, the third power switch SW3, the fifth power switch SW5, the sixth power switch SW6 and the seventh power switch SW7 operate according to the duty ratio (e.g., T2/(T1+T2)) of the switching control signals Ctrl, to generate the second intermediate voltage V2 at the second end Nc12 of the first conversion capacitor C1 and to generate the second proportional voltage Vlx2 at the proportional voltage node Np.

More specifically, in the promptly falling mode, during a duty period (in this embodiment, a duty period is a period wherein the second power switch SW2 is controlled to be nonconductive according to the duty ratio, such as the period T2 in FIG. 3C), the third power switch SW3, the fifth power switch SW5 and the seventh power switch SW7 are controlled to be conductive, whereas, the second power switch SW2 and the sixth power switch SW6 are controlled to be nonconductive. Under such situation, in the capacitive power conversion circuit 31, the first conversion capacitor C1 is correspondingly coupled between the input voltage Vin and the ground voltage level, such that a connection path between the input voltage Vin and the first end Nc11 of the first conversion capacitor C1 and a connection path between the second end Nc12 of the first conversion capacitor C1 and the ground voltage level are conductive, whereby the second intermediate voltage V2 has the high level (i.e., the ground level) and a voltage across the first end Nc11 and the second end Nc12 of the first conversion capacitor C1 has a level equal to the input voltage Vin. On the other hand, in the inductive power conversion circuit 32, a connection path between the proportional voltage node Np and the ground voltage level is controlled to be conductive, so that the inductor L is coupled between the ground voltage level and the output voltage Vout, whereby the second proportional voltage V2 has the ground level.

During a non-duty period (in this embodiment, a non-duty period is a period wherein the second power switch SW2 is controlled to be conductive according to the duty ratio, such as the period T1 in FIG. 3C), the second power switch SW2 and the sixth power switch SW6 are controlled to be conductive, whereas, the third power switch SW3, the fifth power switch SW5 and the seventh power switch SW7 are controlled to be nonconductive. Under such situation, in the capacitive power conversion circuit 31, the first conversion capacitor C1 is correspondingly coupled between the proportional voltage node Np and the ground level, such that a connection path between the first end Nc11 of the first conversion capacitor C1 and the ground voltage level and a connection path between the second end Nc12 of the first conversion capacitor C1 and the proportional voltage node Np are controlled to be conductive. Under such situation, the second intermediate voltage V2 is pumped to a low level (i.e., −Vin) by adding the ground level with a voltage (which is equal to the input voltage Vin in this embodiment) stored in the first conversion capacitor C1. In this embodiment, as shown in FIG. 3C, during a non-duty period (e.g., period T1), the second intermediate voltage V2 is pumped to a low level (i.e., −Vin). On the other hand, in the inductive power conversion circuit 32, the second power switch SW2 is controlled to be conductive, and the seventh power switch SW7 is controlled to be nonconductive, such that the inductor L is coupled between the second intermediate voltage V2 and the output voltage Vout, whereby the second proportional voltage V2 has a low level (i.e., −Vin).

In the embodiment where the switching power conversion circuit 3 operates in a promptly falling mode, a part of the falling slope of the inductor current iL is determined according to a difference between a low level (i.e., −Vin) of the second proportional voltage Vlx2 and the output voltage Vout. Another part of the falling slope of the inductor current iL is determined according to a difference between the high level (i.e., ground level) of the second proportional voltage Vlx2 and the output voltage Vout. Because the absolute value of the low level (i.e., −Vin) of the second proportional voltage Vlx2 is greater than ground level in the prior art, the absolute value of the falling slope of the inductor current iL in the present invention is greater than the absolute value of the falling slope of the inductor current iL in the prior art; the falling slope of the inductor current iL in the present invention is not limited by the ground level, so the inductor current iL can be promptly reduced. It is noteworthy that, in this embodiment, regardless whether it is during a duty period or a non-duty period, the slope of the inductor current iL is a falling slope.

Figure 3D:
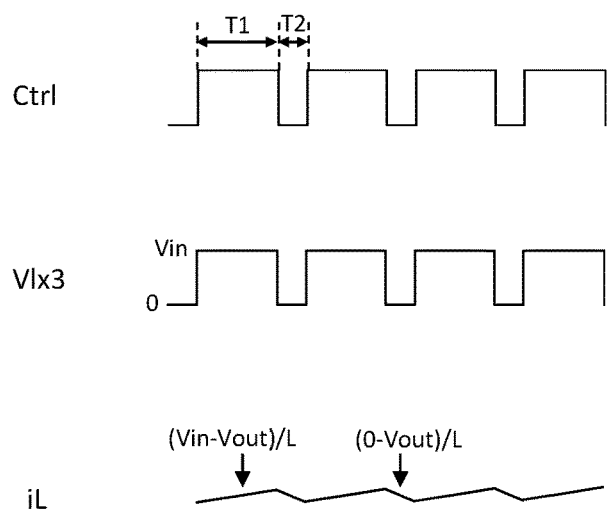
FIG. 3D illustrates a waveform diagram depicting a case where a switching power conversion circuit of the present invention operates in a general mode.

Please refer to FIG. 3A in conjugation with FIG. 3D. FIG. 3D illustrates a waveform diagram depicting a case where the switching power conversion circuit of the present invention operates in a general mode. In a general mode, in one embodiment, the third power switch SW3 and the fifth power switch SW5 of the capacitive power conversion circuit 31 are controlled to be conductive, whereas, the second power switch SW2, the fourth power switch SW4 and the sixth power switch SW6 are controlled to be nonconductive. Under such situation, in the capacitive power conversion circuit 31, the first end Nc11 of the first conversion capacitor C1 has a constant voltage (i.e., Vin). On the other hand, in the inductive power conversion circuit 32, the first power switch SW1 and the seventh power switch SW7 of the inductive power conversion circuit 32 are configured to periodically switch the coupling relationship of the inductor L among the constant voltage, the output voltage Vout and the ground voltage level according to the duty ratio of the switching control signal Ctrl (in this embodiment, the switching control signal Ctrl can correspond to, for example, the first switching control signal Ctr1), such that a third proportional voltage Vlx3 at the proportional voltage node Np has a high level which corresponds to a level (i.e., Vin) of the constant voltage and a low level which corresponds to ground level. In this embodiment, in the general mode, the rising slope of the inductor current iL is determined according to a difference between the high level (i.e., Vin) of the third proportional voltage Vlx3 and the output voltage Vout, whereas, the falling slope of the inductor current iL is determined according to a difference between the low level (i.e. the ground level) of the third proportional voltage Vlx3 and the output voltage Vout. In this embodiment when the switching power conversion circuit 3 operates in the general mode, the inductor current iL is not be promptly elevated up or reduced.

Figure 4:
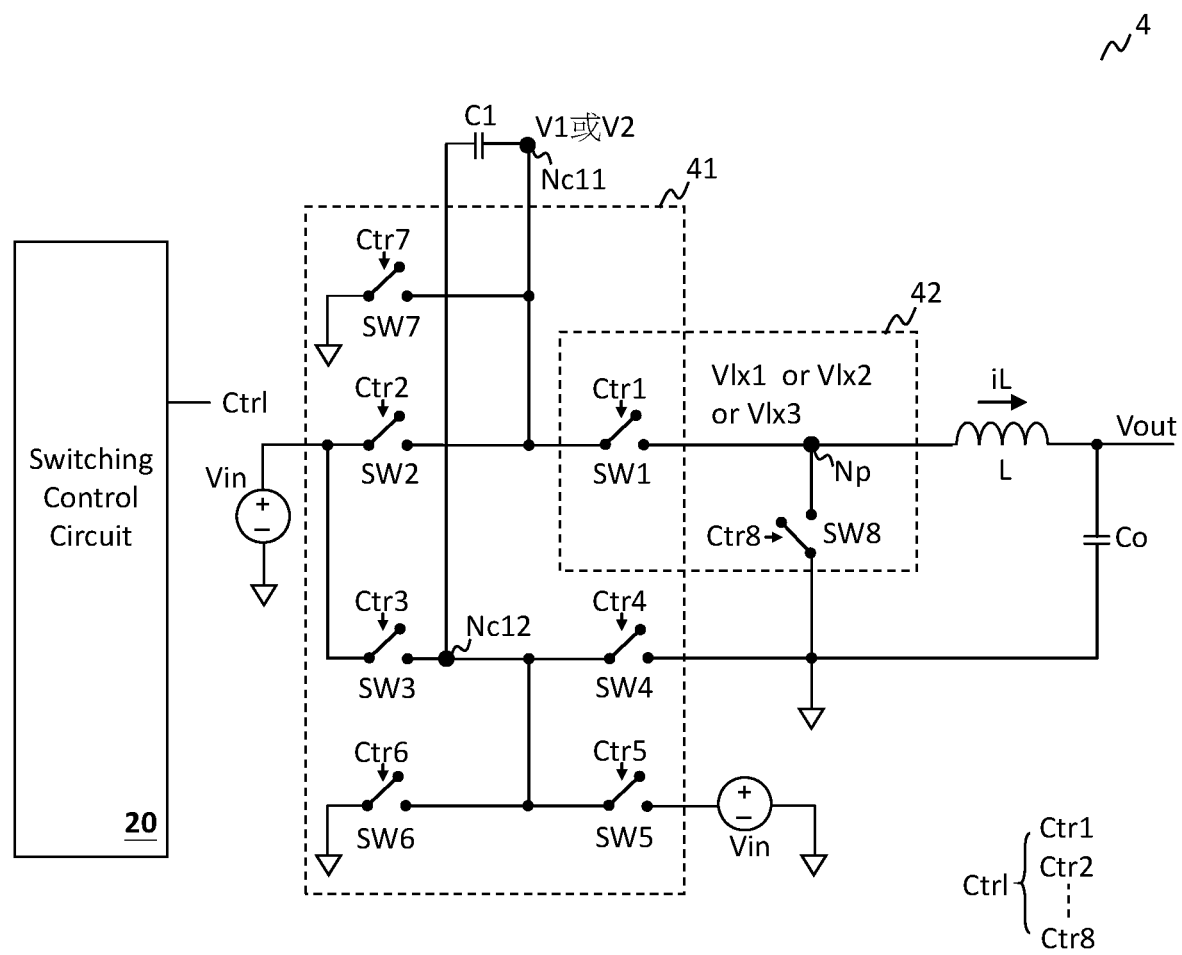
FIG. 4 shows a schematic block diagram of a switching power conversion circuit according to another specific embodiment of the present invention.

Please refer to FIG. 4, which shows a schematic block diagram of a switching power conversion circuit (i.e., switching power conversion circuit 4) according to a specific embodiment of the present invention. The switching power conversion circuit 4 comprises: a switching control circuit 20, a first conversion capacitor C1, a capacitive power conversion circuit 41, an inductor L and an inductive power conversion circuit 42. In one embodiment, an output capacitor Co is coupled between an output voltage Vout and ground voltage level.

In one embodiment, a power switch SWx includes a first power switch SW1. The first power switch SW1 is coupled between the first end Nc11 of the first conversion capacitor C1 and the proportional voltage node Np. The first power switch SW1 is the power switch shared by the capacitive power conversion circuit 41 and the inductive power conversion circuit 42. In this embodiment, the capacitive power conversion circuit 41 is configured as a charge pump circuit. The power switches SWy of the capacitive power conversion circuit 41 include: a third power switch SW3, a fourth power switch SW4, a fifth power switch SW5, a sixth power switch SW6 and a seventh power switch SW7.

In one embodiment, the second power switch SW2 is coupled between the input voltage Vin and the first end Nc11 of the first conversion capacitor C1; the third power switch SW3 is coupled between the input voltage Vin and the second end Nc12 of the first conversion capacitor C1; the fourth power switch SW4 is coupled between the second end Nc12 of the first conversion capacitor C1 and the ground voltage level; the fifth power switch SW5 is coupled between the input voltage Vin and the second end Nc12 of the first conversion capacitor C1; the sixth power switch SW6 is coupled between the second end Nc12 of the first conversion capacitor C1 and the ground voltage level; and the seventh power switch SW7 is coupled between the first end Nc11 of the first conversion capacitor C1 and the ground voltage level.

Please still refer to FIG. 4. In this embodiment, the inductive power conversion circuit 42 is configured as a buck switching power conversion circuit. The power switch SWz of the inductive power conversion circuit 42 further includes an eighth power switch SW8, which is coupled between the proportional voltage node Np and the ground voltage level. It is noteworthy that, in this embodiment, the switching control signal Ctrl generated by the switching control circuit 20 includes first to eighth switching control signals Ctrl1~Ctrl8 for controlling the corresponding first to eighth power switches SW1~SW8, respectively.

In one embodiment, the switching power conversion circuit 4 can operate in a promptly rising mode, a promptly falling mode or a general mode. Please refer to FIG. 4 in conjugation with FIG. 3B. In the promptly rising mode, the fifth power switch SW5, the sixth power switch SW6 and the seventh power switch SW7 are controlled to be nonconductive. The first power switch SW1, the second power switch SW2, the third power switch SW3, the fourth power switch SW4 and the eighth power switch SW8 are respectively controlled by the first, second, third, fourth and eighth switching control signals (Ctr1~Ctr4 and Ctr8), so that the first power switch SW1, the second power switch SW2, the third power switch SW3, the fourth power switch SW4 and the eighth power switch SW8 operate according to the duty ratio (e.g., T1/(T1+T2)) of the switching control signals Ctrl, to generate the first intermediate voltage V1 at the first end Nc11 of the first conversion capacitor C1 and to generate the first proportional voltage Vlx1 at the proportional voltage node Np.

More specifically, in the promptly rising mode, during a non-duty period (in this embodiment, a non-duty period is a period wherein the first power switch SW1 is controlled to be nonconductive according to the duty ratio, such as the period T2 in FIG. 3B), the second power switch SW2, the fourth power switch SW4 and the eighth power switch SW8 are controlled to be conductive, whereas, the first power switch SW1 and the third power switch SW3 are controlled to be nonconductive. Under such situation, in the capacitive power conversion circuit 41, the first conversion capacitor C1 is correspondingly coupled between the input voltage Vin and the ground voltage level, such that a connection path between the input voltage Vin and the first end Nc11 of the first conversion capacitor C1, a connection path between the second end Nc12 of the first conversion capacitor C1 are controlled to be conductive. That is, the first conversion capacitor C1 is charged to a voltage level which is equal to the input voltage Vin via the second power switch SW2 and the fourth power switch SW4, whereby the first intermediate voltage V1 has a low level (i.e., the input voltage Vin). On the other hand, in the inductive power conversion circuit 42, a connection path between the proportional voltage node Np and the ground voltage level are conductive, so that the inductor L is coupled between the ground voltage level and the output voltage Vout, whereby the first proportional voltage Vlx1 has ground level.

In the promptly rising mode, during a duty period (in this embodiment, a duty period is a period wherein the first power switch SW1 is controlled to be conductive according to the duty ratio, such as the period T1 in FIG. 3B), the first power switch SW1 and the third power switch SW3 are controlled to be conductive, whereas, the second power switch SW2, the fourth power switch SW4 and the eighth power switch SW8 are controlled to be nonconductive. Under such situation, in the capacitive power conversion circuit 41, the first conversion capacitor C1 is correspondingly coupled between the input voltage Vin and the proportional voltage node Np, such that a connection path between the input voltage Vin and the second end Nc12 of the first conversion capacitor C1 and a connection path between the first end Nc11 of the first conversion capacitor C1 and the proportional voltage node Np are conductive. Under such situation, the first intermediate voltage V1 is pumped up to the high level by adding the input voltage Vin with a voltage (which is equal to the input voltage Vin in this embodiment) stored in the first conversion capacitor C1. In this embodiment, as shown in FIG. 3B, during a duty period (e.g., period T1), the first intermediate voltage V1 is pumped up to the high level (i.e., 2*Vin). On the other hand, in the inductive power conversion circuit 42, the first power switch SW1 is controlled to be conductive, and the eighth power switch SW8 is controlled to be nonconductive, such that the inductor L is coupled between the first intermediate voltage V1 and the output voltage Vout, whereby the first proportional voltage V1 has the high level (i.e., 2*Vin).

In this embodiment when the switching power conversion circuit 2 operates in a promptly rising mode, the inductor current iL can be promptly elevated up, in the same way as explained previously with reference to FIGS. 3A and 3B, so the details thereof are not redundantly repeated here.

Please refer to FIG. 4 in conjugation with FIG. 3C. In the promptly falling mode, in one embodiment, the second power switch SW2, the third power switch SW3 and the fourth power switch SW4 are controlled to be nonconductive. The first power switch SW1, the fifth power switch SW5, the sixth power switch SW6, the seventh power switch SW7 and the eighth power switch SW8 are respectively controlled by the first, fifth, sixth, seventh and eighth switching control signals (Ctr1 and Ctr5~Ctr8), so that the first power switch SW1, the fifth power switch SW5, the sixth power switch SW6, the seventh power switch SW7 and the eighth power switch SW8 operate according to the duty ratio (e.g., T2/(T1+T2)) of the switching control signals Ctrl, to generate the second intermediate voltage V2 at the first end Nc11 of the first conversion capacitor C1 and to generate the second proportional voltage Vlx2 at the proportional voltage node Np.

More specifically, in the promptly falling mode, during a duty period (in this embodiment, a duty period is a period wherein the first power switch SW1 is controlled to be nonconductive according to the duty ratio, such as the period T2 in FIG. 3C), the fifth power switch SW5, the seventh power switch SW7 and the eighth power switch SW8 are controlled to be conductive, whereas, the first power switch SW1 and the sixth power switch SW6 are controlled to be nonconductive. Under such situation, in the capacitive power conversion circuit 41, the first conversion capacitor C1 is correspondingly coupled between the input voltage Vin and the ground voltage level, such that a connection path between the input voltage Vin and the second end Nc12 of the first conversion capacitor C1 and a connection path between the first end Nc11 of the first conversion capacitor C1 and the ground voltage level are conductive, whereby the second intermediate voltage V2 has the high level (i.e., the ground level). It is noteworthy that, in this embodiment, the direction for the voltage across the first conversion capacitor C1 is opposite to the direction for the voltage across the first conversion capacitor C1 in the previous case where the switching power conversion circuit operates in the promptly rising mode. On the other hand, in the inductive power conversion circuit 42, a connection path between the proportional voltage node Np and the ground voltage level is controlled to be conductive, so that the inductor L is coupled between the ground voltage level and the output voltage Vout, whereby the second proportional voltage V2 has the ground level.

During a non-duty period (in this embodiment, a non-duty period is a period wherein the first power switch SW1 is controlled to be conductive according to the duty ratio, such as the period T1 in FIG. 3C), the first power switch SW and the sixth power switch SW6 are controlled to be conductive, whereas, the fifth power switch SW5, the seventh power switch SW7 and the eighth power switch SW8 are controlled to be nonconductive. Under such situation, in the capacitive power conversion circuit 41, the first conversion capacitor C1 is correspondingly coupled between the proportional voltage node Np and the ground level, such that a connection path between the second end Nc12 of the first conversion capacitor C1 and the ground voltage level and a connection path between the first end Nc11 of the first conversion capacitor C1 and the proportional voltage node are conductive. Under such situation, the second intermediate voltage V2 is pumped to a low level (i.e., -Vin) by adding the ground level with a voltage (which is equal to the input voltage Vin in this embodiment) stored in the first conversion capacitor C1. In this embodiment, as shown in FIG. 3C, during a non-duty period (e.g., period T1), the second intermediate voltage V2 is pumped to a low level (i.e., -Vin). On the other hand, in the inductive power conversion circuit 42, the first power switch SW1 is controlled to be conductive, and the eighth power switch SW8 is controlled to be nonconductive, such that the inductor L is coupled between the second intermediate voltage V2 and the output voltage Vout, whereby the second proportional voltage V2 has a low level (i.e., -Vin).

In this embodiment when the switching power conversion circuit 4 operates in a promptly falling mode, the inductor current iL can be promptly reduced in the same way as explained previously with reference to FIGS. 3A and 3C, so the details thereof are not redundantly repeated here.

Please refer to FIG. 4 in conjugation with FIG. 3D. In a general mode, in one embodiment, the second power switch SW2 and the fourth power switch SW4 of the capacitive power conversion circuit 41 are controlled to be conductive, whereas, the third power switch SW3, the fifth power switch SW5, the sixth power switch SW6 and the seventh power switch SW7 are controlled to be nonconductive. Under such situation, in the capacitive power conversion circuit 41, the first end Nc11 of the first conversion capacitor C1 has a constant voltage (i.e., Vin). On the other hand, in the inductive power conversion circuit 42, the first power switch SW1 and the eighth power switch SW8 of the inductive power conversion circuit 42 are configured to periodically switch the coupling relationship of the inductor L among the constant voltage, the output voltage Vout and the ground voltage level according to the duty ratio of the switching control signal Ctrl, such that a third proportional voltage Vlx3 at the proportional voltage node Np has a high level which corresponds to a level (i.e., Vin) of the constant voltage, and a low level which corresponds to ground level. In this embodiment when the switching power conversion circuit 4 operates in the general mode, the inductor current iL will not be promptly elevated up or reduced, the same as explained previously with reference to FIGS. 3A and 3D, so the details thereof are not redundantly repeated here.

Figure 5:
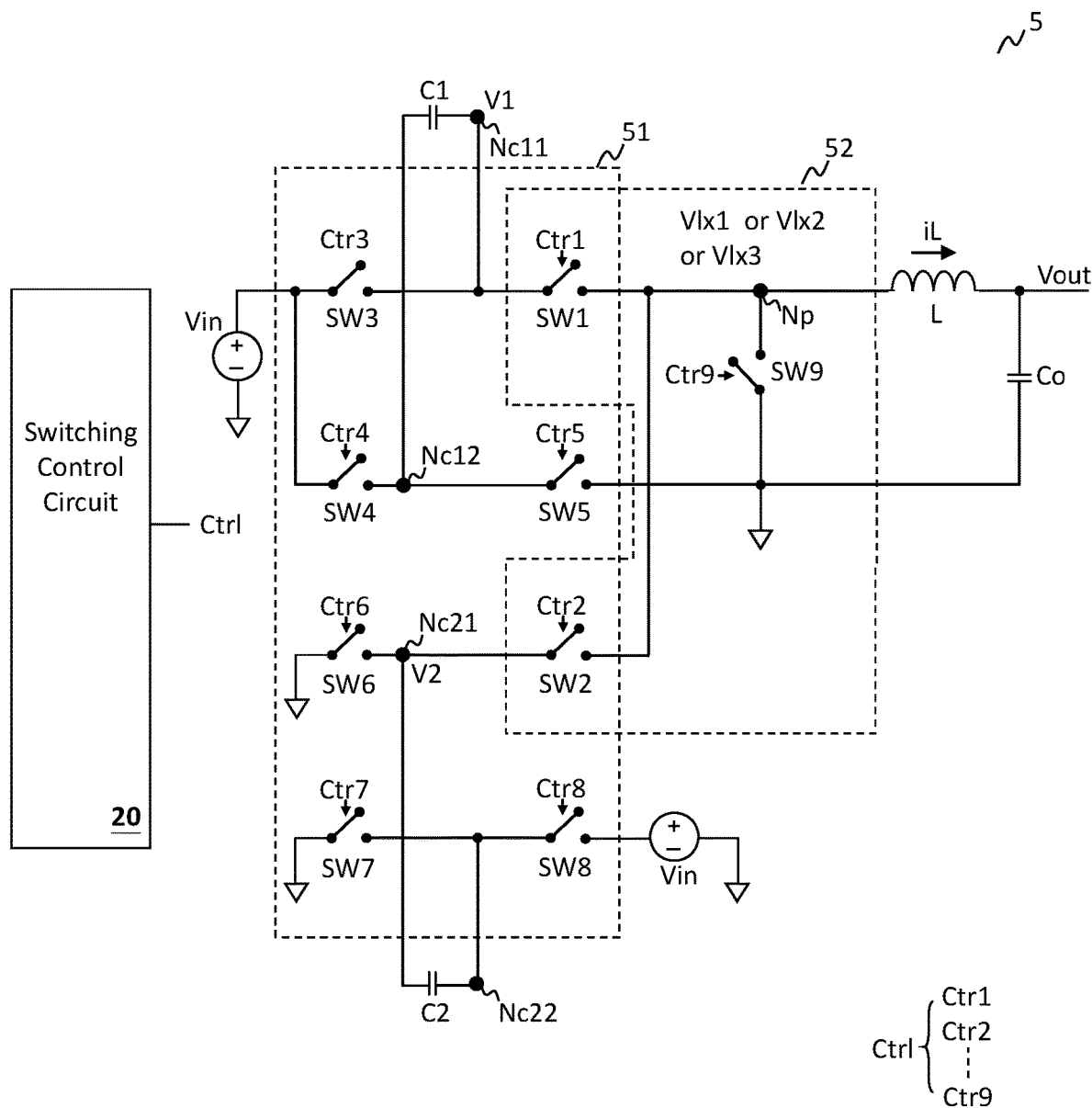
FIG. 5 shows a schematic block diagram of a switching power conversion circuit according to yet another specific embodiment of the present invention.

Please refer to FIG. 5, which shows a schematic block diagram of a switching power conversion circuit (i.e., switching power conversion circuit 5) according to a specific embodiment of the present invention. The switching power conversion circuit 5 comprises: a switching control circuit 20, a first conversion capacitor C1, a second conversion capacitor C2, a capacitive power conversion circuit 51, an inductor L and an inductive power conversion circuit 52. In one embodiment, an output capacitor Co is coupled between an output voltage Vout and ground voltage level.

In one embodiment, a power switch SWx includes a first power switch SW1 and a second power switch SW2. The first power switch SW1 is coupled between the first end Nc11 of the first conversion capacitor C1 and the proportional voltage node Np, whereas, the second power switch SW2 is coupled between the first end Nc21 of second conversion capacitor C2 and the proportional voltage node Np. The first power switch SW1 and the second power switch SW2 are the power switches shared by the capacitive power conversion circuit 41 and the inductive power conversion circuit 42. In this embodiment, the capacitive power conversion circuit 51 is configured as a charge pump circuit. The power switches SWy of the capacitive power conversion circuit 51 include: a third power switch SW3, a fourth power switch SW4, a fifth power switch SW5 and a sixth power switch SW6, a seventh power switch SW7 and an eighth power switch SW8.

In one embodiment, the third power switch SW3 is coupled between an input voltage Vin and the first end Nc11 of the first conversion capacitor C1; the fourth power switch SW4 is coupled between the input voltage Vin and the second end Nc12 of the first conversion capacitor C1; the fifth power switch SW5 is coupled between the second end Nc12 of the first conversion capacitor C1 and ground voltage level; the sixth power switch SW6 is coupled between the first end Nc21 of the second conversion capacitor C2 and the ground voltage level; the seventh power switch SW7 is coupled between the second end Nc22 of the second conversion capacitor C2 and the ground voltage level; and an eighth power switch SW8 is coupled between the second end Nc22 of the second conversion capacitor C2 and the input voltage Vin.

Please still refer to FIG. 5. In this embodiment, the inductive power conversion circuit 52 is configured as a buck switching power conversion circuit. The power switch SWz of the inductive power conversion circuit 52 further includes a ninth power switch SW9, which is coupled between the proportional voltage node Np and the ground voltage level. In this embodiment, the switching control signal Ctrl generated by the switching control circuit 20 includes first to ninth switching control signals Ctrl1~Ctrl9 for controlling the corresponding first to ninth power switches SW1~SW9, respectively.

In one embodiment, the switching power conversion circuit 5 can operate in a promptly rising mode, a promptly falling mode or a general mode. Please refer to FIG. 5 in conjugation with FIG. 3B. In the promptly rising mode, the second power switch SW2, the sixth power switch SW6, the seventh power switch SW7 and the eighth power switch SW8 are controlled to be nonconductive. The first power switch SW1, the third power switch SW3, the fourth power switch SW4, the fifth power switch SW5 and the ninth power switch SW9 are respectively controlled by the first, third, fourth, fifth and ninth switching control signals (Ctr1, Ctr3~Ctr5 and Ctr9), so that the first power switch SW1, the third power switch SW3, the fourth power switch SW4, the fifth power switch SW5 and the ninth power switch SW9 operate according to the duty ratio (e.g., T1/(T1+T2)) of the switching control signals Ctrl, to generate the first intermediate voltage V1 at the first end Nc11 of the first conversion capacitor C1 and to generate the first proportional voltage Vlx1 at the proportional voltage node Np.

More specifically, in the promptly rising mode, during a non-duty period (in this embodiment, a non-duty period is a period wherein the first power switch SW1 is controlled to be nonconductive according to the duty ratio, such as the period T2 in FIG. 3B), the third power switch SW3, the fifth power switch SW5 and the ninth power switch SW9 are controlled to be conductive, whereas, the first power switch SW1 and the fourth power switch SW4 are controlled to be nonconductive. Under such situation, in the capacitive power conversion circuit 51, the first conversion capacitor C1 is correspondingly coupled between the input voltage Vin and the ground voltage level, such that a connection path between the input voltage Vin and the first end Nc11 of the first conversion capacitor C1 and a connection path between the second end Nc12 of the first conversion capacitor C1 and the ground voltage level are conductive. That is, the first conversion capacitor C1 is charged to a voltage level which is equal to the input voltage Vin via the third power switch SW3 and the fifth power switch SW5, whereby the first intermediate voltage V1 has a low level (i.e., the input voltage Vin). On the other hand, in the inductive power conversion circuit 52, a connection path between the proportional voltage node Np and the ground voltage level are conductive, so that the inductor L is coupled between the ground voltage level and the output voltage Vout, whereby the first proportional voltage Vlx1 has ground level.

In the promptly rising mode, during a duty period (in this embodiment, a duty period is a period wherein the first power switch SW1 is controlled to be conductive according to the duty ratio, such as the period T1 in FIG. 3B), the first power switch SW1 and the fourth power switch SW4 are controlled to be conductive, whereas, the third power switch SW3, the fifth power switch SW5 and the ninth power switch SW9 are controlled to be nonconductive. Under such situation, in the capacitive power conversion circuit 51, the first conversion capacitor C1 is correspondingly coupled between the input voltage Vin and the proportional voltage node Np, such that a connection path between the input voltage Vin and the second end Nc12 of the first conversion capacitor C1 and a connection path between the first end Nc11 of the first conversion capacitor C1 and the proportional voltage node Np are conductive. Under such situation, the first intermediate voltage V1 is pumped up to the high level by adding the input voltage Vin with a voltage (which is equal to the input voltage Vin in this embodiment) stored in the first conversion capacitor C1. In this embodiment, as shown in FIG. 3B, during a duty period (e.g., period T1), the first intermediate voltage V1 is pumped up to the high level (i.e., 2*Vin). On the other hand, in the inductive power conversion circuit 52, the first power switch SW1 is controlled to be conductive, and the ninth power switch SW9 is controlled to be nonconductive, such that the inductor L is coupled between the first intermediate voltage V1 and the output voltage Vout, whereby the first proportional voltage V1 has the high level (i.e., 2*Vin).

In this embodiment when the switching power conversion circuit 5 operates in a promptly rising mode, the inductor current iL can be promptly elevated up in the same way as explained previously with reference to FIGS. 3A and 3B, so the details thereof are not redundantly repeated here.

Please refer to FIG. 5 in conjugation with FIG. 3C. In the promptly falling mode, in one embodiment, the first power switch SW1, the third power switch SW3, the fourth power switch SW4 and the fifth power switch SW5 are controlled to be nonconductive. The second power switch SW2, the sixth power switch SW6, the seventh power switch SW7, the eighth power switch SW8 and the ninth power switch SW9 are respectively controlled by the second, sixth, seventh, eighth and ninth switching control signals (Ctr2, Ctr6 and Ctr7~Ctr9), so that the second power switch SW2, the sixth power switch SW6, the seventh power switch SW7, the eighth power switch SW8 and the ninth power switch SW9 operate according to the duty ratio (e.g., T2/(T1+T2)) of the switching control signals Ctrl, to generate the second intermediate voltage V2 at the first end Nc21 of the second conversion capacitor C2 and to generate the second proportional voltage Vlx2 at the proportional voltage node Np.

More specifically, in the promptly falling mode, during a duty period (in this embodiment, a duty period is a period wherein the second power switch SW2 is controlled to be nonconductive according to the duty ratio, such as the period T2 in FIG. 3C), the sixth power switch SW6, the eighth power switch SW8 and the ninth power switch SW9 are controlled to be conductive, whereas, the second power switch SW2 and the seventh power switch SW7 are controlled to be nonconductive. Under such situation, in the capacitive power conversion circuit 51, the second conversion capacitor C2 is correspondingly coupled between the input voltage Vin and the ground voltage level, such that a connection path between the input voltage Vin and the second end Nc22 of the second conversion capacitor C2, a connection path between the first end Nc21 of the second conversion capacitor C2 and the ground voltage level are conductive, whereby the second intermediate voltage V2 has the high level (i.e., the ground level). On the other hand, in the inductive power conversion circuit 52, a connection path between the proportional voltage node Np and the ground voltage level is controlled to be conductive, so that the inductor L is coupled between the ground voltage level and the output voltage Vout, whereby the second proportional voltage V2 has the ground level.

In the promptly falling mode, during a non-duty period (in this embodiment, a non-duty period is a period wherein the first power switch SW1 is controlled to be conductive according to the duty ratio, such as the period T1 in FIG. 3C), the second power switch SW2 and the seventh power switch SW7 are controlled to be conductive, whereas, the sixth power switch SW6, the eighth power switch SW8 and the ninth power switch SW9 are controlled to be nonconductive. Under such situation, in the capacitive power conversion circuit 51, the second conversion capacitor C2 is correspondingly coupled between the proportional voltage node Np and the ground level, such that a connection path between the second end Nc22 of the second conversion capacitor C2 and the ground voltage level and a connection path between the first end Nc21 of the second conversion capacitor C2 and the proportional voltage node Np are controlled to be conductive. Under such situation, the second intermediate voltage V2 is pumped to a low level (i.e., −Vin) by adding the ground level with a voltage (which is equal to the input voltage Vin in this embodiment) stored in the second conversion capacitor C2. In this embodiment, as shown in FIG. 3C, during a non-duty period (e.g., period T1), the second intermediate voltage V2 is pumped to a low level (i.e., −Vin). On the other hand, in the inductive power conversion circuit 52, the second power switch SW2 is controlled to be conductive, and the ninth power switch SW9 is controlled to be nonconductive, such that the inductor L is coupled between the second intermediate voltage V2 and the output voltage Vout, whereby the second proportional voltage V2 has a low level (i.e., −Vin).

(即-Vin)。

In this embodiment when the switching power conversion circuit 5 operates in a promptly falling mode, the inductor current iL can be promptly reduced in the same way as explained previously with reference to FIGS. 3A and 3C, so the details thereof are not redundantly repeated here.

Please refer to FIG. 5 in conjugation with FIG. 3D. In a general mode, in one embodiment, the third power switch SW3 and the fifth power switch SW5 of the capacitive power conversion circuit 51 are controlled to be conductive, whereas, the second power switch SW2, the fourth power switch SW4, the sixth power switch SW6, the seventh power switch SW7 and the eighth power switch SW8 are controlled to be nonconductive. Under such situation, in the capacitive power conversion circuit 51, the first end Nc11 of the first conversion capacitor C1 has a constant voltage (i.e., Vin). On the other hand, in the inductive power conversion circuit 52, the first power switch SW1 and the ninth power switch SW9 of the inductive power conversion circuit 52 are configured to periodically switch a coupling relationship of the inductor L among the constant voltage, the output voltage Vout and the ground voltage level according to the duty ratio, such that a third proportional voltage Vlx3 at the proportional voltage node Np has a high level which corresponds to a level (i.e., Vin) of the constant voltage, and a low level which corresponds to ground level. In this embodiment when the switching power conversion circuit 5 operates in the general mode, the inductor current iL will not be promptly elevated up or reduced, the same as explained previously with reference to FIGS. 3A and 3D, so the details thereof are not redundantly repeated here.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching power conversion circuit, comprising:
   a first conversion capacitor;
   a capacitive power conversion circuit including a plurality of power switches, wherein the plurality of power switches of the capacitive power conversion circuit include at least one shared power switch;
   an inductor coupled between a proportional voltage node and an output voltage, wherein an inductor current flows through the inductor;
   an inductive power conversion circuit including a plurality of power switches, wherein the plurality of power switches of the inductive power conversion circuit include the at least one shared power switch; and
   a switching control circuit, which is configured to operably generate a switching control signal;
   wherein the switching power conversion circuit is configured to operate in a promptly rising mode and a promptly falling mode;
   wherein in the promptly rising mode, the plurality of power switches of the capacitive power conversion circuit are configured to periodically switch a coupling relationship of the first conversion capacitor among the proportional voltage node, an input voltage and ground voltage level according to a duty ratio of the switching control signal, so as to generate a first intermediate voltage at a first end of the first conversion capacitor, wherein the first intermediate voltage is in a form of a pulse wave; and wherein in the promptly rising mode, the plurality of power switches of the inductive power conversion circuit are configured to periodically switch a coupling relationship of the inductor among the first intermediate voltage, the output voltage and the ground voltage level according to the duty ratio of the switching control signal, so as to generate the output voltage; wherein a high level of the first intermediate voltage is a first proportion of the input voltage, wherein the first proportion is a real number which is greater than one, wherein the proportional voltage node has a first proportional voltage;
   wherein in the promptly falling mode, the plurality of power switches of the capacitive power conversion circuit are configured to periodically switch the coupling relationship of the first conversion capacitor among the proportional voltage node, the input voltage and the ground voltage level according to the duty ratio of the switching control signal, so as to generate a second intermediate voltage at the first end or a second end of the first conversion capacitor, wherein the second intermediate voltage is in a form of a pulse wave; and wherein in the promptly falling mode, the plurality of power switches of the inductive power conversion circuit are configured to periodically switch a coupling relationship of the inductor among the second intermediate voltage, the output voltage and the ground voltage level according to the duty ratio of the switching control signal, so as to generate the output voltage; wherein a low level of the second intermediate voltage is a second proportion of the input voltage, wherein the second proportion is a real number which is smaller than or equal to minus one ($-1$), wherein the proportional voltage node has a second proportional voltage;
   wherein in the promptly rising mode, a rising slope of the inductor current is determined according to a difference between a high level of the first proportional voltage and the output voltage; wherein in the promptly falling mode, a falling slope of the inductor current is determined according to a difference between a low level of the second proportional voltage and the output voltage.

2. The switching power conversion circuit of claim 1, wherein the switching power conversion circuit is further configured to operate in a general mode; wherein in the general mode, a part of the plurality of power switches of the capacitive power conversion circuit are conductive, whereas another part of the plurality of power switches of the capacitive power conversion circuit are nonconductive, such that the first end of the first conversion capacitor has a constant voltage; wherein the plurality of power switches of the inductive power conversion circuit periodically switch the coupling relationship of the inductor among the constant voltage, the output voltage and the ground voltage level according to the duty ratio of the switching control signal, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;
   wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

3. The switching power conversion circuit of claim 1, wherein the at least one shared power switch includes a first power switch and a second power switch, wherein the first power switch is coupled between the first end of the first conversion capacitor and the proportional voltage node, whereas, the second power switch is coupled between the second end of the first conversion capacitor and the proportional voltage node; wherein the capacitive power conversion circuit is configured as a charge pump circuit, wherein the plurality of power switches of the capacitive power conversion circuit further include:
   a third power switch coupled between the input voltage and the first end of the first conversion capacitor;
   a fourth power switch coupled between the input voltage and the second end of the first conversion capacitor;
   a fifth power switch coupled between the second end of the first conversion capacitor and the ground voltage level; and
   a sixth power switch coupled between the first end of the first conversion capacitor and the ground voltage level;
   wherein the inductive power conversion circuit is configured as a buck switching power conversion circuit, wherein the plurality of power switches of the inductive power conversion circuit further include a seventh power switch coupled between the proportional voltage node and the ground voltage level;

wherein in the promptly rising mode, the first power switch, the third power switch, the fourth power switch, the fifth power switch and the seventh power switch operate according to the duty ratio, wherein during a duty period, the first power switch and the fourth power switch are controlled to be conductive, whereas, the third power switch, the fifth power switch and the seventh power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the third power switch, the fifth power switch and the seventh power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level, and a connection path between the proportional voltage node and the ground voltage level are conductive, whereby the first intermediate voltage has a low level and the first proportional voltage has ground level;

wherein in the promptly falling mode, the second power switch, the third power switch, the fifth power switch, the sixth power switch and the seventh power switch operate according to the duty ratio, wherein during a non-duty period, the second power switch and the sixth power switch are controlled to be conductive, whereas, the third power switch, the fifth power switch and the seventh power switch are controlled to be nonconductive, such that a connection path between the first end of the first conversion capacitor and the ground voltage level and a connection path between the second end of the first conversion capacitor and the proportional voltage node are conductive, wherein the second end of the first conversion capacitor has the second intermediate voltage and the second intermediate voltage has the low level and the second proportional voltage has the low level; wherein during a duty period, the third power switch, the fifth power switch and the seventh power switch are controlled to be conductive, whereas, the second power switch and the sixth power switch are controlled to be nonconductive, such that a connection path between the input voltage and the first end of the first conversion capacitor, a connection path between the second end of the first conversion capacitor and the ground voltage level, and a connection path between the proportional voltage node and the ground voltage level are conductive, whereby the second intermediate voltage has a high level and the second proportional voltage has the ground level.

4. The switching power conversion circuit of claim 3, wherein the switching power conversion circuit is further configured to operate in a general mode, wherein in the general mode, the third power switch and the fifth power switch of the capacitive power conversion circuit are controlled to be conductive, whereas, the second power switch, the fourth power switch and the sixth power switch are controlled to be nonconductive, such that the first end of the first conversion capacitor has a constant voltage; wherein the first power switch and the seventh power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;

wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

5. The switching power conversion circuit of claim 1, wherein the at least one shared power switch includes a first power switch, wherein the first power switch is coupled between the first end of the first conversion capacitor and the proportional voltage node, wherein the capacitive power conversion circuit is configured as a charge pump circuit, wherein the plurality of power switches of the capacitive power conversion circuit further include:

a second power switch coupled between the input voltage and the first end of the first conversion capacitor;

a third power switch coupled between the input voltage and the second end of the first conversion capacitor;

a fourth power switch coupled between the second end of the first conversion capacitor and the ground voltage level;

a fifth power switch coupled between the input voltage and the second end of the first conversion capacitor;

a sixth power switch coupled between the second end of the first conversion capacitor and the ground voltage level; and a seventh power switch coupled between the first end of the first conversion capacitor and the ground voltage level;

wherein the inductive power conversion circuit is configured as a buck switching power conversion circuit, wherein the plurality of power switches of the inductive power conversion circuit further include an eighth power switch coupled between the proportional voltage node and the ground voltage level;

wherein in the promptly rising mode, the first power switch, the second power switch, the third power switch, the fourth power switch and the eighth power switch operate according to the duty ratio, wherein during a duty period, the first power switch and the third power switch are controlled to be conductive, whereas, the second power switch, the fourth power switch and the eighth power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the second power switch, the fourth power switch and the eighth power switch are controlled to be conductive, whereas, the first power switch and the third power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level;

wherein in the promptly falling mode, the first power switch, the fifth power switch, the sixth power switch, the seventh power switch and the eighth power switch operate according to the duty ratio, wherein during a non-duty period, the first power switch and the sixth power switch are controlled to be conductive, whereas, the fifth power switch, the seventh power switch and the eighth power switch are controlled to be nonconductive, such that a connection path between the second end of the first conversion capacitor and the ground voltage level and a connection path between the first end of the first conversion capacitor and the proportional voltage node are conductive, wherein the first end of the first conversion capacitor has the second intermediate voltage, such that the second intermediate voltage has the low level and the second proportional voltage has the low level; wherein during a duty period, the fifth power switch, the seventh power switch and the eighth power switch are controlled to be conductive, whereas, the first power switch and the sixth power switch are controlled to be nonconductive, such that a connection path between the input voltage and the second end of the first conversion capacitor, a connection path between the first end of the first conversion capacitor and the ground voltage level and a connection path between the proportional voltage node and the ground voltage level are conductive, whereby the second intermediate voltage has a high level and the second proportional voltage has the ground level.

6. The switching power conversion circuit of claim 5, wherein the switching power conversion circuit is further configured to operate in a general mode, wherein in the general mode, the second power switch and the fourth power switch of the capacitive power conversion circuit are controlled to be conductive, whereas, the third power switch, the fifth power switch, the sixth power switch and the seventh power switch are controlled to be nonconductive, such that the first end of the first conversion capacitor has a constant voltage; wherein the first power switch and the eighth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to the ground level; wherein the level of the constant voltage is substantially equal to the input voltage;

wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

7. A switching power conversion circuit, comprising:
a first conversion capacitor;
a second conversion capacitor;
a capacitive power conversion circuit including a plurality of power switches, wherein the plurality of power switches of the capacitive power conversion circuit include at least one shared power switch;
an inductor coupled between a proportional voltage node and an output voltage, wherein an inductor current flows through the inductor;
an inductive power conversion circuit including a plurality of power switches, wherein the plurality of power switches of the inductive power conversion circuit include the at least one shared power switch; and
a switching control circuit, which is configured to operably generate a switching control signal;
wherein the at least one shared power switch includes a first power switch and a second power switch, wherein the first power switch is coupled between the first end of the first conversion capacitor and the proportional voltage node, whereas, the second power switch is coupled between the first end of the second conversion capacitor and the proportional voltage node; wherein the capacitive power conversion circuit is configured as a charge pump circuit, wherein the plurality of power switches of the capacitive power conversion circuit further include:
a third power switch coupled between an input voltage and the first end of the first conversion capacitor;
a fourth power switch coupled between the input voltage and the second end of the first conversion capacitor;
a fifth power switch coupled between the second end of the first conversion capacitor and ground voltage level;
a sixth power switch coupled between the first end of the second conversion capacitor and the ground voltage level;
a seventh power switch coupled between the second end of the second conversion capacitor and the ground voltage level; and
an eighth power switch coupled between the second end of the second conversion capacitor and the input voltage;
wherein the inductive power conversion circuit is configured as a buck switching power conversion circuit, wherein the plurality of power switches of the inductive power conversion circuit further include a ninth power switch coupled between the proportional voltage node and the ground voltage level;
wherein the switching power conversion circuit is configured to operate in a promptly rising mode and a promptly falling mode;
wherein in the promptly rising mode, the first power switch, the third power switch, the fourth power switch, the fifth power switch and the ninth power switch operate according to the duty ratio of the switching control signal, wherein during a duty period, the first power switch and the fourth power switch are controlled to be conductive, whereas, the third power switch, the fifth power switch and the ninth power switch are controlled to be nonconductive, such that a connection path between the input voltage and the second end of the first conversion capacitor and a connection path between the first end of the first conversion capacitor and the proportional voltage node are conductive, whereby the first intermediate voltage at the first end of the first conversion capacitor has a high level and the first proportional voltage at the proportional voltage node has a high level; wherein during a non-duty period, the third power switch, the fifth power switch and the ninth power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level;

wherein in the promptly falling mode, the second power switch, the sixth power switch, the seventh power switch, the eighth power switch and the ninth power switch operate according to the duty ratio, wherein during a non-duty period, the second power switch and the seventh power switch are controlled to be conductive, whereas, the sixth power switch, the eighth power switch and the ninth power switch are controlled to be nonconductive, such that a connection path between the second end of the second conversion capacitor and the ground voltage level and a connection path between the first end of the second conversion capacitor and the proportional voltage node are conductive, whereby the second intermediate voltage at the first end of the second conversion capacitor has a low level and the second proportional voltage at the proportional voltage node has a low level; wherein during a duty period, the sixth power switch, the eighth power switch and the ninth power switch are controlled to be conductive, whereas, the second power switch and the seventh power switch are controlled to be nonconductive, such that a connection path between the input voltage and the second end of the second conversion capacitor, a connection path between the first end of the second conversion capacitor and the ground voltage level and a connection path between the proportional voltage node and the ground voltage level are conductive, whereby the second intermediate voltage has a high level and the second proportional voltage has the ground level.

8. The switching power conversion circuit of claim 7, wherein the switching power conversion circuit is further configured to operate in a general mode, wherein in the general mode, the third power switch and the fifth power switch of the capacitive power conversion circuit are controlled to be conductive, whereas, the second power switch, the fourth power switch, the sixth power switch, the seventh power switch and the eighth power switch are controlled to be nonconductive, such that the first end of the first conversion capacitor has a constant voltage; wherein the first power switch and the ninth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;

wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

9. A switching circuit, comprising:
a capacitive power conversion circuit including a plurality of power switches, wherein the plurality of power switches of the capacitive power conversion circuit include at least one shared power switch;
an inductive power conversion circuit including a plurality of power switches, wherein the plurality of power switches of the inductive power conversion circuit include the at least one shared power switch; and
a switching control circuit, which is configured to operably generate a switching control signal;
wherein the switching power conversion circuit is configured to operate in a promptly rising mode and a promptly falling mode;
wherein in the promptly rising mode, the plurality of power switches of the capacitive power conversion circuit are configured to periodically switch a coupling relationship of the first conversion capacitor among the proportional voltage node, an input voltage and ground voltage level according to a duty ratio of the switching control signal, so as to generate a first intermediate voltage at a first end of the first conversion capacitor, wherein the first intermediate voltage is in a form of a pulse wave; and wherein in the promptly rising mode, the plurality of power switches of the inductive power conversion circuit are configured to periodically switch a coupling relationship of the inductor among the first intermediate voltage, the output voltage and the ground voltage level according to the duty ratio of the switching control signal, so as to generate the output voltage; wherein a high level of the first intermediate voltage is a first proportion of the input voltage, wherein the first proportion is a real number which is greater than one, wherein the proportional voltage node has a first proportional voltage;
wherein in the promptly falling mode, the plurality of power switches of the capacitive power conversion circuit are configured to periodically switch the coupling relationship of the first conversion capacitor among the proportional voltage node, the input voltage and the ground voltage level according to the duty ratio of the switching control signal, so as to generate a second intermediate voltage at the first end or a second end of the first conversion capacitor, wherein the second intermediate voltage is in a form of a pulse wave; and wherein in the promptly falling mode, the plurality of power switches of the inductive power conversion circuit are configured to periodically switch a coupling relationship of the inductor among the second intermediate voltage, the output voltage and the ground voltage level according to the duty ratio of the switching control signal, so as to generate the output voltage; wherein a low level of the second intermediate voltage is a second proportion of the input voltage, wherein the second proportion is a real number which is smaller than or equal to minus one (−1), wherein the proportional voltage node has a second proportional voltage;
wherein in the promptly rising mode, a rising slope of the inductor current is determined according to a difference between a high level of the first proportional voltage and the output voltage; wherein in the promptly falling mode, a falling slope of the inductor current is determined according to a difference between a low level of the second proportional voltage and the output voltage.

10. The switching circuit of claim 9, wherein the switching power conversion circuit is further configured to operate in a general mode; wherein in the general mode, a part of the plurality of power switches of the capacitive power conversion circuit are conductive, whereas another part of the plurality of power switches of the capacitive power conversion circuit are nonconductive, such that the first end of the first conversion capacitor has a constant voltage; wherein the plurality of power switches of the inductive power conversion circuit are configured to periodically switch the coupling relationship of the inductor among the constant voltage, the output voltage and the ground voltage level according to the duty ratio of the switching control signal, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;

wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

11. The switching circuit of claim 9, wherein the at least one shared power switch includes a first power switch and a second power switch, wherein the first power switch is coupled between the first end of the first conversion capacitor and the proportional voltage node, whereas, the second power switch is coupled between the second end of the first conversion capacitor and the proportional voltage node; wherein the capacitive power conversion circuit is configured as a charge pump circuit, wherein the plurality of power switches of the capacitive power conversion circuit further include:

a third power switch coupled between the input voltage and the first end of the first conversion capacitor;
a fourth power switch coupled between the input voltage and the second end of the first conversion capacitor;
a fifth power switch coupled between the second end of the first conversion capacitor and the ground voltage level; and
a sixth power switch coupled between the first end of the first conversion capacitor and the ground voltage level;
wherein the inductive power conversion circuit is configured as a buck switching power conversion circuit, wherein the plurality of power switches of the inductive power conversion circuit further include a seventh power switch coupled between the proportional voltage node and the ground voltage level;
wherein in the promptly rising mode, the first power switch, the third power switch, the fourth power switch, the fifth power switch and the seventh power switch operate according to the duty ratio, wherein during a duty period, the first power switch and the fourth power switch are controlled to be conductive, whereas, the third power switch, the fifth power switch and the seventh power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the third power switch, the fifth power switch and the seventh power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level;

wherein in the promptly falling mode, the second power switch, the third power switch, the fifth power switch, the sixth power switch and the seventh power switch operate according to the duty ratio, wherein during a non-duty period, the second power switch and the sixth power switch are controlled to be conductive, whereas, the third power switch, the fifth power switch and the seventh power switch are controlled to be nonconductive, such that a connection path between the first end of the first conversion capacitor and the ground voltage level and a connection path between the second end of the first conversion capacitor and the proportional voltage node are conductive, wherein the second end of the first conversion capacitor has the second intermediate voltage, such that the second intermediate voltage has the low level and the second proportional voltage has the low level; wherein during a duty period, the third power switch, the fifth power switch and the seventh power switch are controlled to be conductive, whereas, the second power switch and the sixth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the second intermediate voltage has a high level and the second proportional voltage has the ground level.

12. The switching circuit of claim 9, wherein the switching power conversion circuit is further configured to operate in a general mode, wherein in the general mode, the third power switch and the fifth power switch of the capacitive power conversion circuit are controlled to be conductive, whereas, the second power switch, the fourth power switch and the sixth power switch are controlled to be nonconductive, such that the first end of the first conversion capacitor has a constant voltage; wherein the first power switch and the seventh power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;

wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

13. The switching circuit of claim 9, wherein the at least one shared power switch includes a first power switch, wherein the first power switch is coupled between the first end of the first conversion capacitor and the proportional voltage node, wherein the capacitive power conversion circuit is configured as a charge pump circuit, wherein the plurality of power switches of the capacitive power conversion circuit further include:
- a second power switch coupled between the input voltage and the first end of the first conversion capacitor;
- a third power switch coupled between the input voltage and the second end of the first conversion capacitor;
- a fourth power switch coupled between the second end of the first conversion capacitor and the ground voltage level;
- a fifth power switch coupled between the input voltage and the second end of the first conversion capacitor;
- a sixth power switch coupled between the second end of the first conversion capacitor and the ground voltage level; and
- a seventh power switch coupled between the first end of the first conversion capacitor and the ground voltage level;
- wherein the inductive power conversion circuit is configured as a buck switching power conversion circuit, wherein the plurality of power switches of the inductive power conversion circuit further include an eighth power switch coupled between the proportional voltage node and the ground voltage level;
- wherein in the promptly rising mode, the first power switch, the second power switch, the third power switch, the fourth power switch and the eighth power switch operate according to the duty ratio, wherein during a duty period, the first power switch and the third power switch are controlled to be conductive, whereas, the second power switch, the fourth power switch and the eighth power switch are controlled to be nonconductive, such that a connection path between the input voltage and the second end of the first conversion capacitor and a connection path between the first end of the first conversion capacitor and the proportional voltage node are conductive, whereby the first intermediate voltage has the high level and the first proportional voltage has the high level; wherein during a non-duty period, the second power switch, the fourth power switch and the eighth power switch are controlled to be conductive, whereas, the first power switch and the third power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level;
- wherein in the promptly falling mode, the first power switch, the fifth power switch, the sixth power switch, the seventh power switch and the eighth power switch operate according to the duty ratio, wherein during a non-duty period, the first power switch and the sixth power switch are controlled to be conductive, whereas, the fifth power switch, the seventh power switch and the eighth power switch are controlled to be nonconductive, such that a connection path between the second end of the first conversion capacitor and the ground voltage level and a connection path between the first end of the first conversion capacitor and the proportional voltage node are conductive, wherein the first end of the first conversion capacitor has the second intermediate voltage, such that the second intermediate voltage has the low level and the second proportional voltage has the low level; wherein during a duty period, the fifth power switch, the seventh power switch and the eighth power switch are controlled to be conductive, whereas, the first power switch and the sixth power switch are controlled to be nonconductive, such that a connection path between the input voltage and the second end of the first conversion capacitor, a connection path between the first end of the first conversion capacitor and the ground voltage level and a connection path between the proportional voltage node and the ground voltage level are conductive, whereby the second intermediate voltage has a high level and the second proportional voltage has the ground level.

14. The switching circuit of claim 9, wherein the switching power conversion circuit is further configured to operate in a general mode, wherein in the general mode, the second power switch and the fourth power switch of the capacitive power conversion circuit are controlled to be conductive, whereas, the third power switch, the fifth power switch, the sixth power switch and the seventh power switch are controlled to be nonconductive, such that the first end of the first conversion capacitor has a constant voltage; wherein the first power switch and the eighth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to the ground level; wherein the level of the constant voltage is substantially equal to the input voltage;
- wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

15. A switching circuit, comprising:
- a capacitive power conversion circuit including a plurality of power switches, wherein the plurality of power switches of the capacitive power conversion circuit include at least one shared power switch;
- an inductor coupled between a proportional voltage node and an output voltage, wherein an inductor current flows through the inductor;
- an inductive power conversion circuit including a plurality of power switches, wherein the plurality of power switches of the inductive power conversion circuit include the at least one shared power switch; and
- a switching control circuit, which is configured to operably generate a switching control signal;
- wherein the at least one shared power switch includes a first power switch and a second power switch, wherein the first power switch is coupled between the first end of the first conversion capacitor and the proportional voltage node, whereas, the second power switch is coupled between the first end of the second conversion capacitor and the proportional voltage node; wherein the capacitive power conversion circuit is configured as a charge pump circuit, wherein the plurality of power switches of the capacitive power conversion circuit further include:
a third power switch coupled between an input voltage and the first end of the first conversion capacitor;
a fourth power switch coupled between the input voltage and the second end of the first conversion capacitor;
a fifth power switch coupled between the second end of the first conversion capacitor and ground voltage level;
a sixth power switch coupled between the first end of the second conversion capacitor and the ground voltage level;
a seventh power switch coupled between the second end of the second conversion capacitor and the ground voltage level; and
an eighth power switch coupled between the second end of the second conversion capacitor and the input voltage;
wherein the inductive power conversion circuit is configured as a buck switching power conversion circuit, wherein the plurality of power switches of the inductive power conversion circuit further include a ninth power switch coupled between the proportional voltage node and the ground voltage level;
wherein the switching power conversion circuit is configured to operate in a promptly rising mode and a promptly falling mode;
wherein in the promptly rising mode, the first power switch, the third power switch, the fourth power switch, the fifth power switch and the ninth power switch operate according to the duty ratio of the switching control signal, wherein during a duty period, the first power switch and the fourth power switch are controlled to be conductive, whereas, the third power switch, the fifth power switch and the ninth power switch are controlled to be nonconductive, such that a connection path between the input voltage and the second end of the first conversion capacitor and a connection path between the first end of the first conversion capacitor and the proportional voltage node are conductive, whereby the first intermediate voltage at the first end of the first conversion capacitor has a high level and the first proportional voltage at the proportional voltage node has a high level; wherein during a non-duty period, the third power switch, the fifth power switch and the ninth power switch are controlled to be conductive, whereas, the first power switch and the fourth power switch are controlled to be nonconductive, such that a connection path between the input voltage and the first end of the first conversion capacitor, a connection path between the second end of the first conversion capacitor and the ground voltage level and a connection path between the proportional voltage node and the ground voltage level are conductive, whereby the first intermediate voltage has a low level and the first proportional voltage has ground level;

wherein in the promptly falling mode, the second power switch, the sixth power switch, the seventh power switch, the eighth power switch and the ninth power switch operate according to the duty ratio, wherein during a non-duty period, the second power switch and the seventh power switch are controlled to be conductive, whereas, the sixth power switch, the eighth power switch and the ninth power switch are controlled to be nonconductive, such that a connection path between the second end of the second conversion capacitor and the ground voltage level and a connection path between the first end of the second conversion capacitor and the proportional voltage node are conductive, whereby the second intermediate voltage at the first end of the second conversion capacitor has a low level and the second proportional voltage at the proportional voltage node has a low level; wherein during a duty period, the sixth power switch, the eighth power switch and the ninth power switch are controlled to be conductive, whereas, the second power switch and the seventh power switch are controlled to be nonconductive, such that a connection path between the input voltage and the second end of the second conversion capacitor, a connection path between the first end of the second conversion capacitor and the ground voltage level and a connection path between the proportional voltage node and the ground voltage level are conductive, whereby the second intermediate voltage has a high level and the second proportional voltage has the ground level.

16. The switching circuit of claim 15, wherein the switching power conversion circuit is further configured to operate in a general mode, wherein in the general mode, the third power switch and the fifth power switch of the capacitive power conversion circuit are controlled to be conductive, whereas, the second power switch, the fourth power switch, the sixth power switch, the seventh power switch and the eighth power switch are controlled to be nonconductive, such that the first end of the first conversion capacitor has a constant voltage; wherein the first power switch and the ninth power switch of the inductive power conversion circuit are configured to periodically switch the coupling relationship of the inductor among the constant voltage, the output voltage and the ground voltage level according to the duty ratio, such that a third proportional voltage at the proportional voltage node has a high level and a low level, wherein the high level of the third proportional voltage corresponds to a level of the constant voltage, whereas, the low level of the third proportional voltage corresponds to ground level; wherein the level of the constant voltage is substantially equal to the input voltage;
wherein in the general mode, the rising slope of the inductor current is determined according to a difference between the high level of the third proportional voltage and the output voltage; wherein in the general mode, the falling slope of the inductor current is determined according to a difference between the low level of the third proportional voltage and the output voltage.

* * * * *